(12) United States Patent
Tsai et al.

(10) Patent No.: US 8,457,430 B2
(45) Date of Patent: Jun. 4, 2013

(54) REGION-BASED METHOD FOR ITERATIVE REGULARIZATION IMAGE ENHANCEMENT, AND ASSOCIATED REGION-BASED APPARATUS AND ASSOCIATED PROCESSING CIRCUIT

(75) Inventors: Yu-Pao Tsai, Kaohsiung County (TW); Yu-Wen Huang, Taipei (TW); Ying-Jui Chen, Hsinchu County (TW); Shaw-Min Lei, Taipei County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 866 days.

(21) Appl. No.: 12/534,154

(22) Filed: Aug. 2, 2009

(65) Prior Publication Data

US 2011/0026847 A1    Feb. 3, 2011

(51) Int. Cl.
*G06K 9/40* (2006.01)

(52) U.S. Cl.
USPC .......................................... 382/254; 382/265

(58) Field of Classification Search
USPC .................................. 382/254, 265
See application file for complete search history.

(56) References Cited

U.S. PATENT DOCUMENTS

| | | | | | |
|---|---|---|---|---|---|
| 5,376,795 | A | * | 12/1994 | Hasegawa et al. | 250/363.04 |
| 5,650,862 | A | * | 7/1997 | Shimizu et al. | 358/448 |
| 8,031,962 | B2 | * | 10/2011 | Pettigrew et al. | 382/254 |
| 2004/0216125 | A1 | * | 10/2004 | Gazda et al. | 719/310 |
| 2007/0217566 | A1 | * | 9/2007 | Chen et al. | 378/4 |
| 2011/0044524 | A1 | * | 2/2011 | Wang et al. | 382/131 |

FOREIGN PATENT DOCUMENTS

WO    2005069217    7/2005

OTHER PUBLICATIONS

Joshua Trzasko and Armando Manduca, Highly Undersampled Magnetic Resonance Image Reconstruction via Homotopic λ0-Minimization, 2008, IEEE, IEEE Transactions on Medical Imaging, vol. 28, No. 1, Jan. 2009, [retrieved on Jan. 10, 2013]. Retrieved from Internet:<URL: http://ieeexplore.ieee.org/stamp/stamp.jsp?arnumber=04556634.*

Joshua Trzasko and Armando Manduca, Highly Undersampled Magnetic Resonance Image Reconstruction via Homotopic~0-Minimization, 2008, IEEE, IEEE Transactions on Medical Imaging, vol. 28, No. 1, Jan. 2009, [retrieved on Jan. 10, 2013]. Retrieved from Internet: /ieeexplore.ieee.org/stamp/stamp.jsp?arnumber=04556634.*

Miao Qing et al., "Image Restoration Based on Constrained Least Square and Space Iterative", Chinese Journal of Scientific Instrument, vol. 26 No. 8, Aug. 2005, p. 658, 1994-2012 China Academic Journal Electronic Publishing House.

(Continued)

*Primary Examiner* — Gregory F Cunningham
(74) *Attorney, Agent, or Firm* — Winston Hsu; Scott Margo

(57) ABSTRACT

A region-based method for iterative regularization image enhancement, includes: for each region of a plurality of regions of an image, performing at least one gradient calculation of an objective function of a latest representative function of the region and updating the latest representative function according to the gradient calculation; and for the region of the plurality of regions of the image, when at least one predetermined convergence criterion is not satisfied, iteratively updating the latest representative function according to at least one gradient calculation of the same objective function of the latest representative function. In particular, the region-based method further includes: for the region of the plurality of regions of the image, when the predetermined convergence criterion is satisfied, performing postprocessing on the latest representative function of the region to generate an iteratively regularized partial image corresponding to the region. An associated region-based apparatus and processing circuit are further provided.

25 Claims, 19 Drawing Sheets

OTHER PUBLICATIONS

"Study on Image Restoration Algorithms and FPGA Implementation Technology", China Doctor Dissertations Full-text Database, vol. 5, p. 56~57 and p. 95, May 31, 2008.

Shengyang Dai, Mei Han, Ying Wu, Yihong Gong, "Bilateral back-projection for single image super resolution", IEEE International Conference on Multimedia and Expo, 2007.

Seungjoon Yang, Kihyun Hong, "Bilateral interpolation filters for image size conversion", IEEE International Conference on Image Processing, 2005.

Michal Irani, Shmuel Peleg, "Motion analysis for image enhancement; resolution, occlusion, and transparency", Journal of Visual Communication and Image Representation, vol. 4, No. 4, 1993.

* cited by examiner

REGION-BASED METHOD FOR ITERATIVE REGULARIZATION IMAGE ENHANCEMENT, AND ASSOCIATED REGION-BASED APPARATUS AND ASSOCIATED PROCESSING CIRCUIT

BACKGROUND

The present invention relates to image processing such as image restoration/enhancement for degraded images, and more particularly, to a region-based method for iterative regularization image enhancement, and to an associated region-based apparatus and an associated processing circuit.

Image restoration/enhancement for degraded images, such as resolution enhancement (i.e. interpolation), deblur-processing, and noise removal, has been an issue since there is no trivial solution to the problem. For example, given that $g_v$ is a degraded image vector representing a degraded image while $f_v$ is an original image vector representing an original image, the degraded image can be described by utilizing a degradation model as follows:

$$g_v = DBf_v + \eta;$$

where B represents a blur matrix, D represents a sub-sampling matrix, and $\eta$ represents a noise vector. As the blur matrix B and the noise vector $\eta$ are unknown.

SUMMARY

It is therefore an objective of the claimed invention to provide a region-based method for iterative regularization image enhancement, and to provide an associated region-based apparatus and an associated processing circuit, in order to enhance the image processing capability of multimedia electronic products.

An exemplary embodiment of a region-based method for iterative regularization image enhancement comprises: for each region of a plurality of regions of an image, performing at least one gradient calculation of an objective function of a latest representative function of the region and updating the latest representative function according to the gradient calculation; for the region of the image, when at least one predetermined convergence criterion is not satisfied, iteratively updating the latest representative function according to at least one gradient calculation of the same objective function of the latest representative function; and for the region of the image, when at least one predetermined convergence criterion is satisfied, performing postprocessing on the latest representative function of the region to generate an iteratively regularized partial image corresponding to the region.

An exemplary embodiment of a region-based apparatus for iterative regularization image enhancement comprises: a region engine arranged to perform iterative regularization image enhancement; wherein for each region of a plurality of regions of an image, the region engine is arranged to perform at least one gradient calculation of an objective function of a latest representative function of the region and update the latest representative function according to the gradient calculation, iteratively update the latest representative function according to at least one gradient calculation of the same objective function of the latest representative function when at least one predetermined convergence criterion is not satisfied, and perform postprocessing on the latest representative function of the region to generate an iteratively regularized partial image corresponding to the region when the at least one predetermined convergence criterion is satisfied.

An exemplary embodiment of an associated processing circuit comprises at least one processing element, each of which is utilized for performing one iteration of iterative regularization image enhancement and comprises: a first pixel extraction module, a reference pixel extraction module, an error calculation module, and an updating module. The first pixel extraction module is arranged to input pixel data of a first image in a raster scan order and extract pixel data of a first image block of the first image. The reference pixel extraction module is arranged to input pixel data of a reference image in the raster scan order and extract pixel data of a reference image block of the reference image, wherein relative location and size of the reference image block with respect to the reference image correspond to relative location and size of the first image block with respect to the first image. In addition, the error calculation module is arranged to perform error calculations according to the pixel data of the first image block and the pixel data of the reference image block in order to generate one or more iterative error terms regarding a specific pixel of the first image block. Additionally, the updating module is arranged to update the specific pixel based upon the one or more iterative error terms regarding the specific pixel, in order to generate an updated version of the first image for the iteration. In particular, the first and the reference pixel extraction modules are respectively arranged to change and align both of the relative location of the first image block with respect to the first image and the relative location of the reference image block with respect to the reference image, in order to cause the updating module to update each pixel of the first image.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
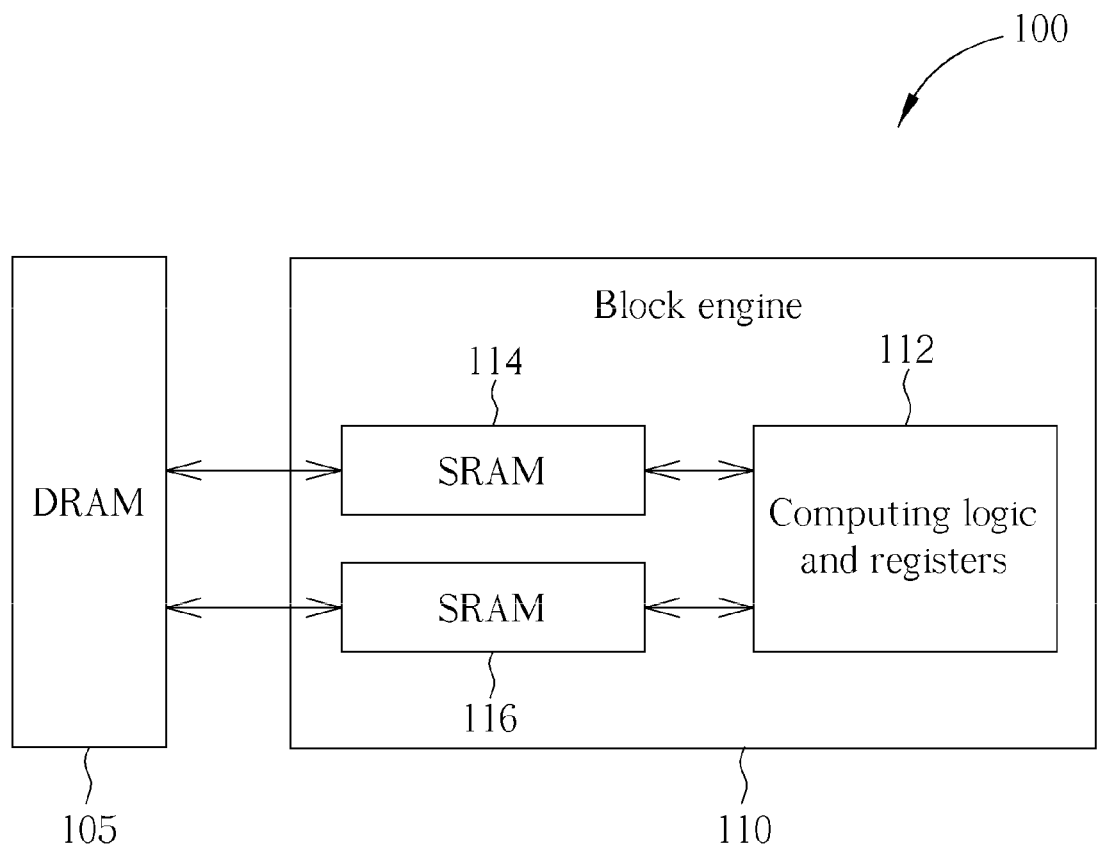
FIG. 1 is a diagram of a region-based apparatus for iterative regularization image enhancement according to a first embodiment of the present invention.

Please refer to FIG. 1, which illustrates a diagram of a region-based apparatus 100 for iterative regularization image enhancement according to a first embodiment of the present invention, where the region-based apparatus 100 comprises a memory arranged to store image data, and further comprises one or more region engines arranged to perform iterative regularization image enhancement. According to this embodiment, the memory is a dynamic random access memory (DRAM) 105, and the region engine(s) are block engine(s). For example, the region-based apparatus 100 of this embodiment comprises a single region engine such as a block engine 110. This is for illustrative purposes only, and is not meant to be a limitation of the present invention. According to a variation of this embodiment, the region-based apparatus 100 comprises two or more region engines such as a plurality of block engines. According to another variation of this embodiment, the memory (e.g. the DRAM 105) is positioned outside the region-based apparatus 100.

As shown in FIG. 1, the aforementioned region engine such as the block engine 110 comprises a computing logic and register unit 112 (labeled "Computing logic and registers"), and further comprises a plurality of region buffers such as two static random access memories (SRAMs) 114 and 116. According to this embodiment, the computing logic and register unit 112 is arranged to perform operations of the region engine, and more particularly, the operations of iterative regularization image enhancement. The two region buffers 114 and 116 are utilized for store data before/after an iteration.

More particularly, the region buffers comprise a first region buffer arranged to store data before/after an iteration, and a second region buffer arranged to store data after/before the same iteration, where the first region buffer and the second region buffer exchange their roles for a next iteration. According to this embodiment, for a specific iteration, the SRAM 114 stores data before the iteration and the SRAM 116 stores data after the iteration. Then, for the next iteration, the SRAM 116 stores data before the iteration and the SRAM 114 stores data after the iteration. Further details can be described by referring to FIG. 2.

Figure 2:
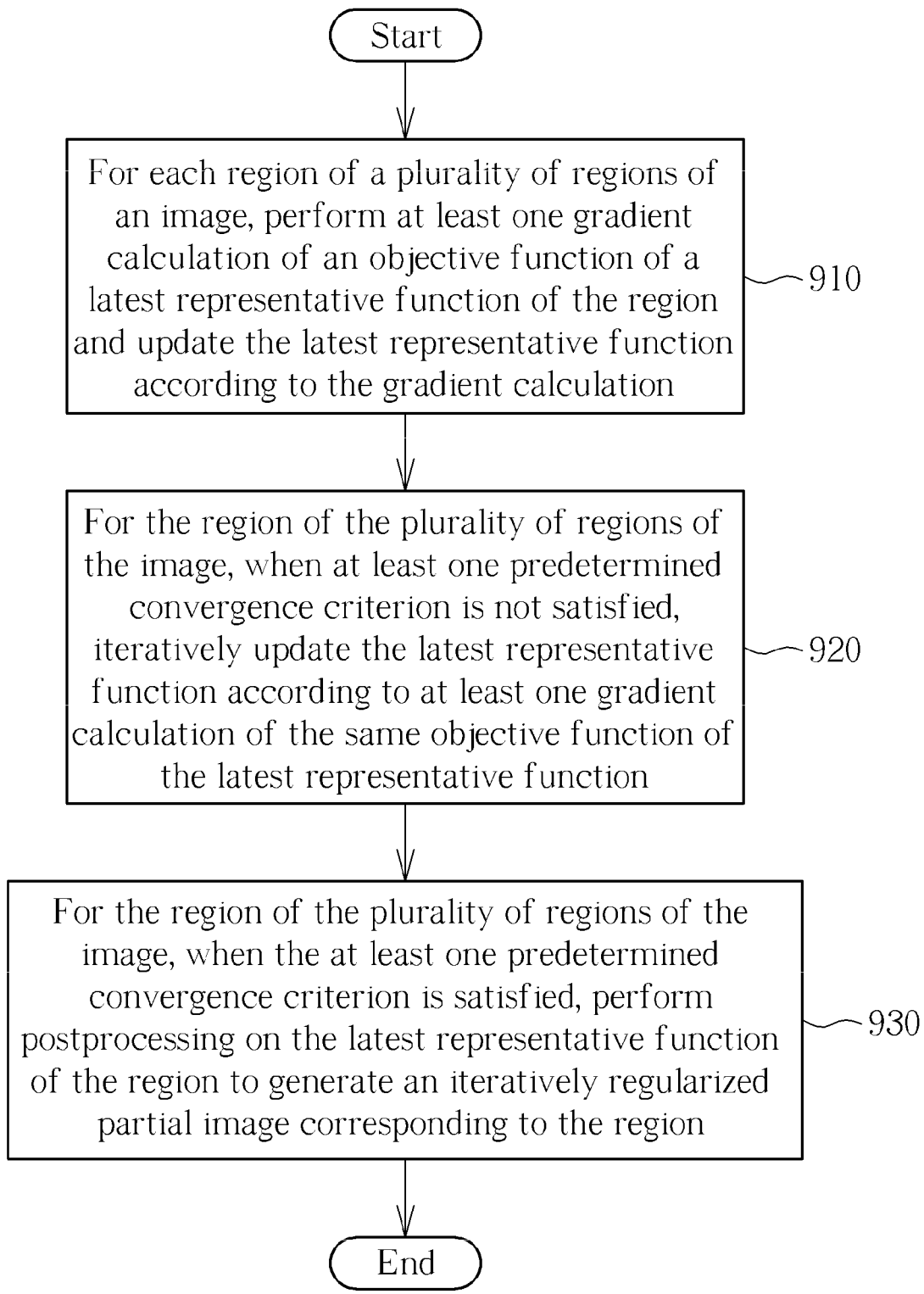
FIG. 2 is a flowchart of a region-based method for iterative regularization image enhancement according to one embodiment of the present invention.

FIG. 2 is a flowchart of a region-based method for iterative regularization image enhancement according to one embodiment of the present invention. The method shown in FIG. 2 can be applied to the apparatus 100, and more particularly, to the region engine(s) mentioned above (e.g. the block engine 110). The method is described as follows.

In Step 910, for each region of an image, a region engine of the one or more region engines (e.g. the block engine 110) is arranged to perform at least one gradient calculation of an objective function of a latest representative function of the region and update the latest representative function according to the gradient calculation.

In Step 920, for the region of the image, when at least one predetermined convergence criterion (e.g. a single convergence criterion, or a plurality of convergence criteria) is not satisfied, the same region engine mentioned in Step 910 (e.g. the block engine 110) is arranged to iteratively update the latest representative function according to at least one gradient calculation of the same objective function of the latest representative function.

In Step 930, for the region of the image, when the predetermined convergence criterion (e.g. the single convergence criterion, or the plurality of convergence criteria) is satisfied, the same region engine mentioned in Step 910 (e.g. the block engine 110) is arranged to perform postprocessing on the latest representative function of the region to generate an iteratively regularized partial image corresponding to the region.

Please note that the number of convergence criteria utilized in Step 920 and 930 can be one or more than one. For example, only one convergence criterion is utilized for determining whether to execute Step 920 or Step 930. In another example, two or more convergence criteria can be utilized for determining whether to execute Step 920 or Step 930.

According to this embodiment, for all regions of the image, the aforementioned one or more region engines (e.g. the block engine 110) are arranged to utilize the same convergence criterion/criteria to determine whether to execute Step 920 or Step 930. This is for illustrative purposes only, and is not meant to be a limitation of the present invention. According to a variation of this embodiment, for the plurality of regions of the image, the aforementioned one or more region engines (e.g. the block engine 110) are arranged to utilize respective predetermined convergence criteria.

In this embodiment, the objective function corresponds to an image enhancement algorithm. In addition, for all regions of the image, the aforementioned one or more region engines (e.g. the block engine 110) are arranged to utilize the same objective function. This is for illustrative purposes only, and is not meant to be a limitation of the present invention. According to a variation of this embodiment, for the plurality of regions of the image, the aforementioned one or more region engines (e.g. the block engine 110) are arranged to utilize respective objective functions of the latest representative functions of the regions. The objective functions correspond to respective image enhancement algorithms. As a result of utilizing the objective functions in this variation, various image enhancement algorithms can be applied to the regions.

Figure 3:
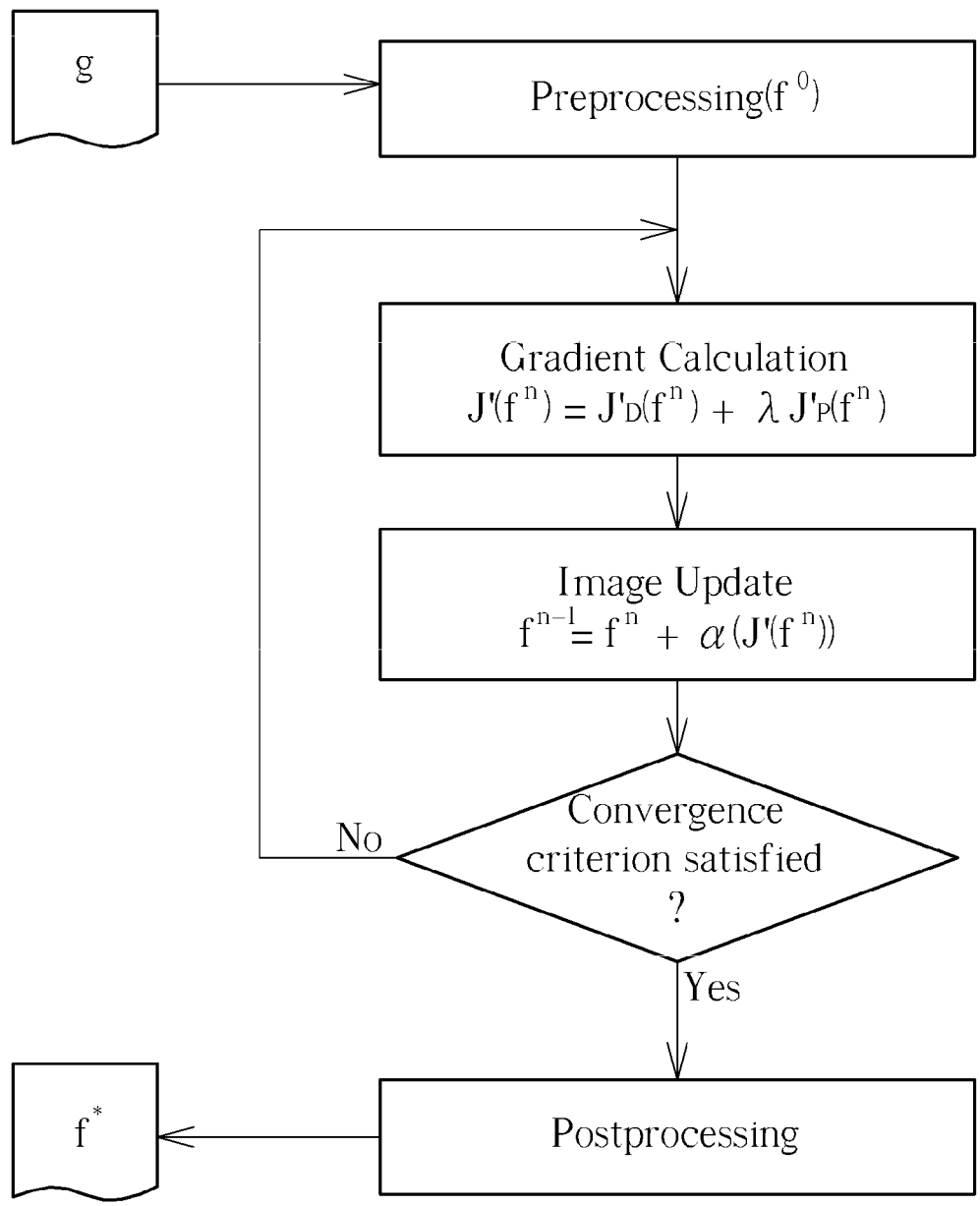
FIG. 3 illustrates an example of some implementation details of the method shown in FIG. 2 according to an embodiment of the present invention.

FIG. 3 illustrates an example of some implementation details of the method shown in FIG. 2 according to an embodiment of the present invention, where the notation "g" represents the image mentioned in Step 910 (e.g. the degraded image mentioned above), and the notation "f*" represents a resultant image.

In this embodiment, the region engine mentioned in Step 910 (e.g. the block engine 110) is arranged to execute the working flow shown in FIG. 3 for each of the regions of the aforementioned image (e.g. the degraded image mentioned above), where the working flow starts with a preprocessing operation (labeled "Preprocessing($f^0$)") and ends with a post-processing operation (labeled "Postprocessing") for each region. As a result, the region engine mentioned in Step 910 (e.g. the block engine 110) generates a plurality of iteratively regularized partial images respectively corresponding to the regions, in order to generate the resultant image f*, where the resultant image f* comprises the iteratively regularized partial images. In particular, the resultant image f* consists of the iteratively regularized partial images.

According to the working flow shown in FIG. 3, the region engine mentioned in Step 910 (e.g. the block engine 110) executes a loop between the preprocessing operation (labeled "Preprocessing($f^0$)") and the postprocessing operation (labeled "Postprocessing") for each region. For example, a first iteration of the loop corresponds to Step 910 for the region, where the notation $f^n$ represents the latest representative function mentioned in Step 910 with the iteration index n being equal to an initial value 0, and the notation J represents the objective function mentioned in Step 910. In the beginning of the first iteration (n=0), the latest representative function $f^n$ is equivalent to $f^0$, which is derived from the preprocessing operation.

Please note that the objective function J of this embodiment is a linear combination of a data fidelity function and a knowledge-guided regularization function, and can be described according to the following equation:

$$J(f)=J_D(f)+\lambda J_P(f) \quad (1);$$

where the notation $J_D$ represents the data fidelity function, and the notation $J_P$ represents the knowledge-guided regularization function. According to Equation (1), the region engine mentioned in Step 910 (e.g. the block engine 110) calculates the objective function J by summing up the data fidelity function $J_D$ and the prior knowledge-guided regularization function $J_P$ weighted by a Lagrange multiplier λ (which can be referred to as a regularization parameter in this embodiment), where the Lagrange multiplier λ is utilized to control a tradeoff between the data fidelity function $J_D$ and the prior knowledge-guided regularization function $J_P$. This is for illustrative purposes only, and is not meant to be a limitation of the present invention. According to a variation of this embodiment, the objective function J is a linear combination of a data fidelity function and a plurality of knowledge-guided regularization functions, and can be described according to the following equation:

$$J(f)=J_D(f)+\lambda_1 J_{P1}(f)+\lambda_2 J_{P2}(f)+\ldots;$$

where the notation $J_{P1}, J_{P2}, \ldots$, etc. represent the knowledge-guided regularization functions. According to the above equation, the region engine mentioned in Step 910 (e.g. the block engine 110) calculates the objective function J by summing up the data fidelity function $J_D$ and the prior knowledge-guided regularization functions $J_{P1}, J_{P2}, \ldots$, etc. respectively weighted by the associated Lagrange multipliers $\lambda_1, \lambda_2, \ldots$, etc.

In practice, the data fidelity function $J_D$ is utilized for representing a reconstruction error, and the prior knowledge-guided regularization functions $J_P$ and $J_{P1}, J_{P2}, \ldots$, etc. are utilized for representing the prior knowledge concerning a desirable solution. As a result, both the reconstruction error and the prior knowledge can be taken into account while computing the gradient calculation.

According to this embodiment, an objective of the working flow shown in FIG. 2 is finding the best solutions for the iteratively regularized partial images respectively corresponding to the regions, which can be carried out by minimizing the objective function j through the iteration(s) for each region. More particularly, the region engine mentioned in Step 910 (e.g. the block engine 110) performs the gradient calculation of the objective function J of the latest representative function $f^n$ of the region by calculating a derivative $J'(f^n)$ of the objective function J of the latest representative function $f^n$, and updates the latest representative function $f^n$ according to the derivative $J'(f^n)$ of the objective function J of the latest representative function $f^n$.

Referring to FIG. 3 (the block labeled "Image Update" especially), the region engine mentioned in Step 910 (e.g. the block engine 110) updates the latest representative function $f^n$ with a step size $\alpha(J'(f^n))$ that is equivalent to a function α of the derivative $J'(f^n)$ of the objective function J of the latest representative function $f^n$, in order to update an intermediate partial image represented by the latest representative function $f^n$, where the step size can be an increment or a decrement. The function α of this embodiment can be a linear function. For example, the step size $\alpha(J'(f^n))$ can be an increment/decrement (i.e. an increment or a decrement) whose absolute value is proportional to a function of the derivative $J'(f^n)$ of the objective function J of the latest representative function $f^n$, and more particularly, is proportional to a predetermined percentage of the derivative $J'(f^n)$. This is for illustrative purposes only, and is not meant to be a limitation of the present invention. According to a variation of this embodiment, the function α can be a nonlinear function.

As long as the convergence criterion is not satisfied, the region engine mentioned in Step 910 (e.g. the block engine 110) operates with one or more subsequent iterations corresponding to Step 920. In this embodiment, the iteration index n is increased with an increment of one when a subsequent iteration is entered.

According to a special case of this embodiment, the objective function J can be defined as follows:

$$J(f)=\|g-DBf\|^2+\lambda\|Hf\|w_t^2;$$

where the operator H is a high-pass filter, the operator $\|.\|$ represents a $l_2$-norm, and the notation $W_t$ represents a weight matrix calculated based upon the content of the neighborhood. As a result, the region engine mentioned in Step 910 (e.g. the block engine 110) is capable of updating the latest representative function $f^n$ according to the following equation:

$$f^{n+1} = f^n + \alpha(J'(f^n))$$
$$= f^n + \alpha(J'_D(f^n) + \lambda J'_P(f^n));$$

where:

$$J'_D(f^n) = B^T D^T(g - DBf^n); \text{ and}$$

$$J'_P(f^n) = J'_S(f^n) = H^T W_i H f^n.$$

This is for illustrative purposes only, and is not meant to be a limitation of the present invention. According to a variation of this embodiment, the objective function J can be much more complicated. Thus, better hardware resources may be required for implementing the computing logic and register unit 112 (labeled "Computing logic and registers") shown in FIG. 1.

Figure 4:
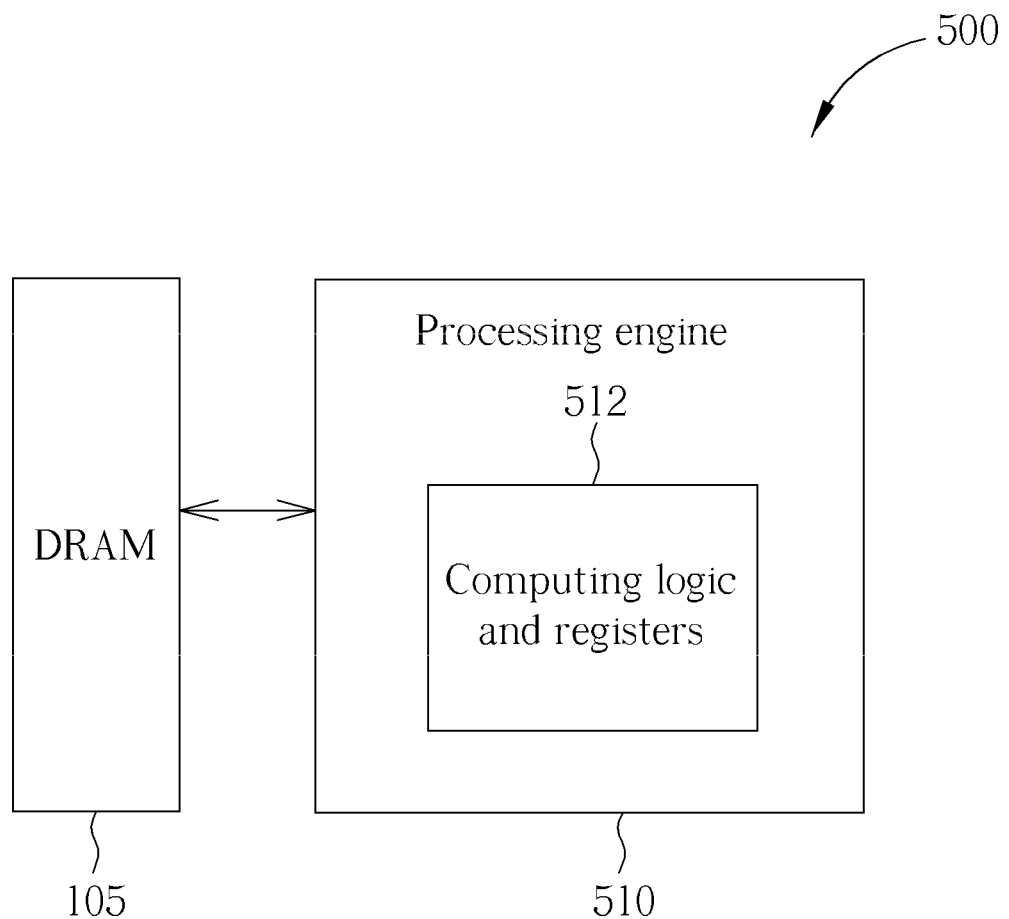
FIG. 4 is a diagram of a frame-based apparatus for iterative regularization image enhancement according to an embodiment of the present invention.
Figure 5:
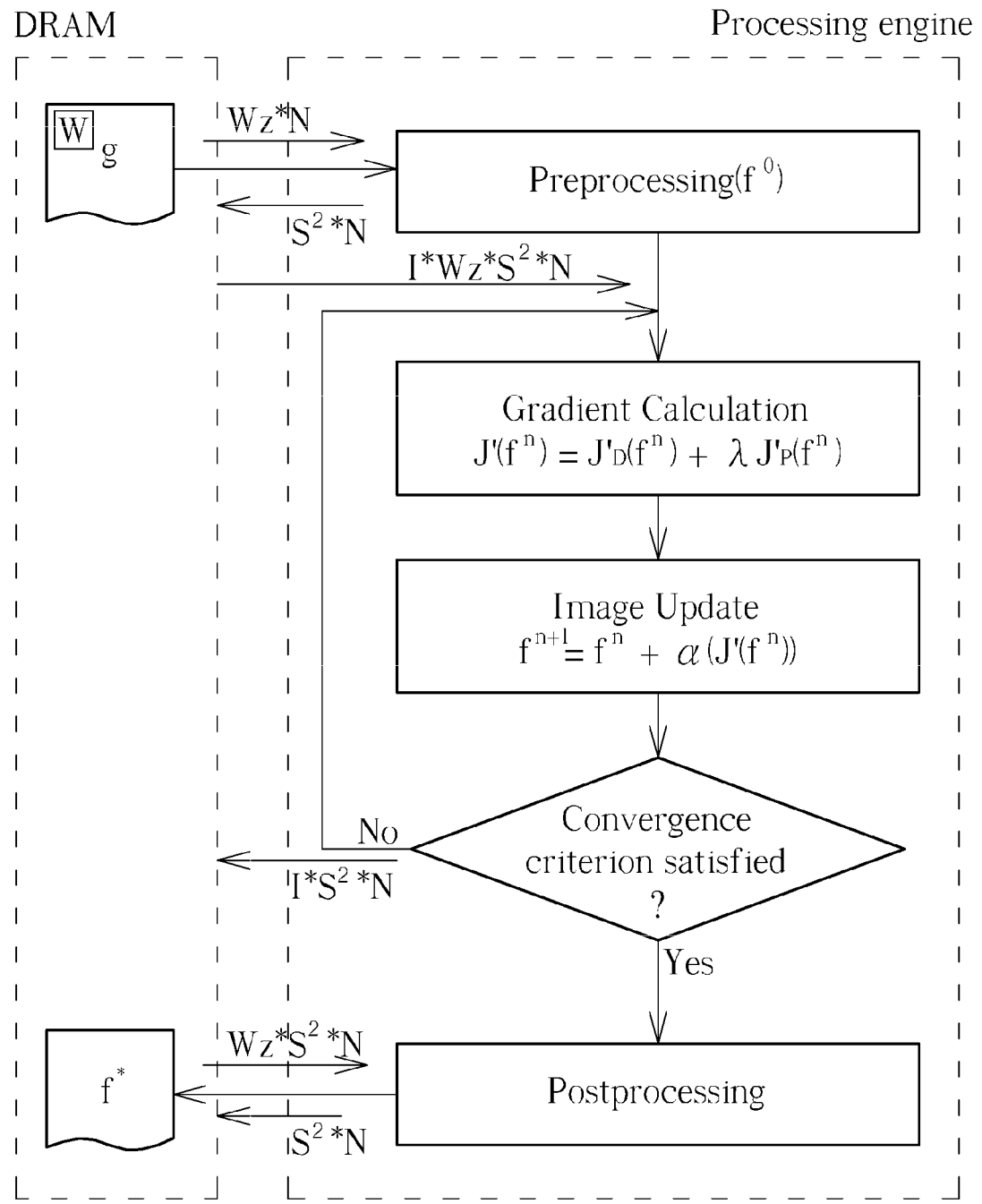
FIG. 5 illustrates some data flows between the processing engine and the DRAM shown in FIG. 4 and the data amounts respectively corresponding to the data flows according to a variation of the embodiment shown in FIG. 3.

Please refer to FIG. 4 and FIG. 5. FIG. 4 is a diagram of a frame-based apparatus 500 for iterative regularization image enhancement according to an embodiment of the present invention, where the frame-based apparatus 500 comprises the DRAM 105 and a processing engine 510 comprising a computing logic and register unit 512 (labeled "Computing logic and registers"). FIG. 5 illustrates some data flows between the processing engine 510 and the DRAM 105 shown in FIG. 4 and the data amounts respectively corresponding to the data flows according to a variation of the embodiment shown in FIG. 3.

As shown in FIG. 5, some parameters such as Wz, N, S, and I are utilized for describing the data amounts respectively corresponding to the data flows. The parameter Wz represents a window size of a window W for processing a pixel within the region. That is, the value of the parameter Wz is equal to the number of pixels in the window W. In addition, the parameter N represents the size of an input image. That is, the value of the parameter N is equal to the number of pixels of the input image. Additionally, the parameter S represents a scaling factor, and the parameter I represents an iteration number, which is a maximum value of the iteration index n.

For at least a portion of a frame, the processing engine 510 first loads data of a data amount of Wz*N from the DRAM 105, in order to perform the preprocessing operation (labeled "Preprocessing($f^0$)"). After the preprocessing operation, the processing engine 510 saves data of a data amount of $S^2$*N into the DRAM 105. During the iterations for the portion of the frame, the processing engine 510 loads data of a total data amount of I*Wz*$S^2$*N from the DRAM 105, and saves data of a total data amount of I*$S^2$*N into the DRAM 105. In addition, the processing engine 510 loads data of a data amount of Wz*$S^2$*N from the DRAM 105, in order to perform the postprocessing operation (labeled "Postprocessing"). After the postprocessing operation, the processing engine 510 saves data of a data amount of $S^2$*N into the DRAM 105.

Therefore, the total access bytes per frame (ABPF) can be described as follows:

$ABPF = (1+(I+1)*Wz*S^2)*Wz*N+(I+2)*S^2*N.$

For example, given that N=(720*480), S=2, I=5, and Wz=(8*8), $ABPF = 34005657600 (\approx 340M).$ The window size Wz of windows used by preprocessing, gradient calculation, and postprocessing can be the same as shown in the above example, or these window sizes can be different in some other embodiments.

Figure 6:
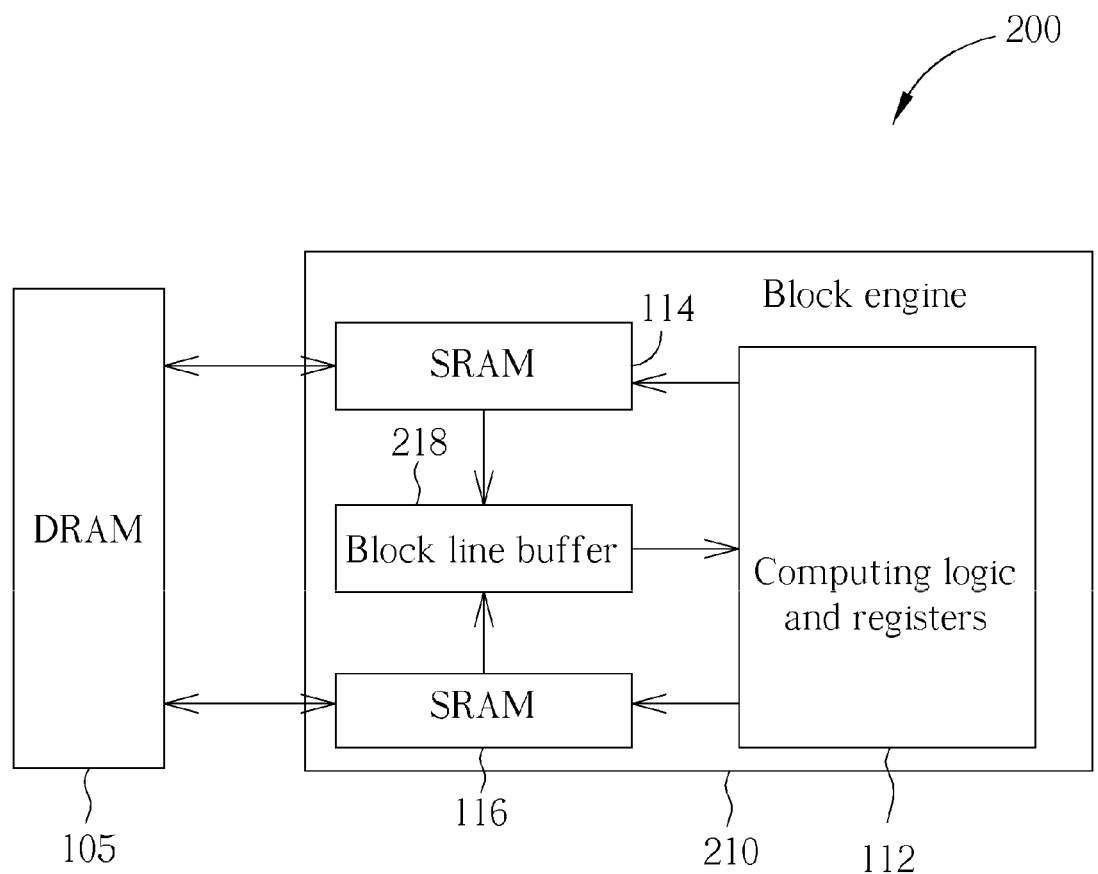
FIG. 6 is a diagram of a region-based apparatus for iterative regularization image enhancement according to a second embodiment of the present invention.

FIG. 6 is a diagram of a region-based apparatus 200 for iterative regularization image enhancement according to a second embodiment of the present invention. The region-based apparatus 200 of this embodiment is varied from the region-based apparatus 100 shown in FIG. 1 by further comprising a block line buffer 218. As shown in FIG. 6, the region-based apparatus 200 comprises a memory such as the DRAM 105, and a region engine such a block engine 210. In addition to the computing logic and register unit 112 (labeled "Computing logic and registers") and the two SRAMs 114 and 116 mentioned above, the block engine 210 further comprises a region line buffer such as the block line buffer 218, where the region line buffer is utilized for line-buffering within the region mentioned in Step 910. In particular, the region line buffer 218 comprises one or more line buffers.

Figure 7:
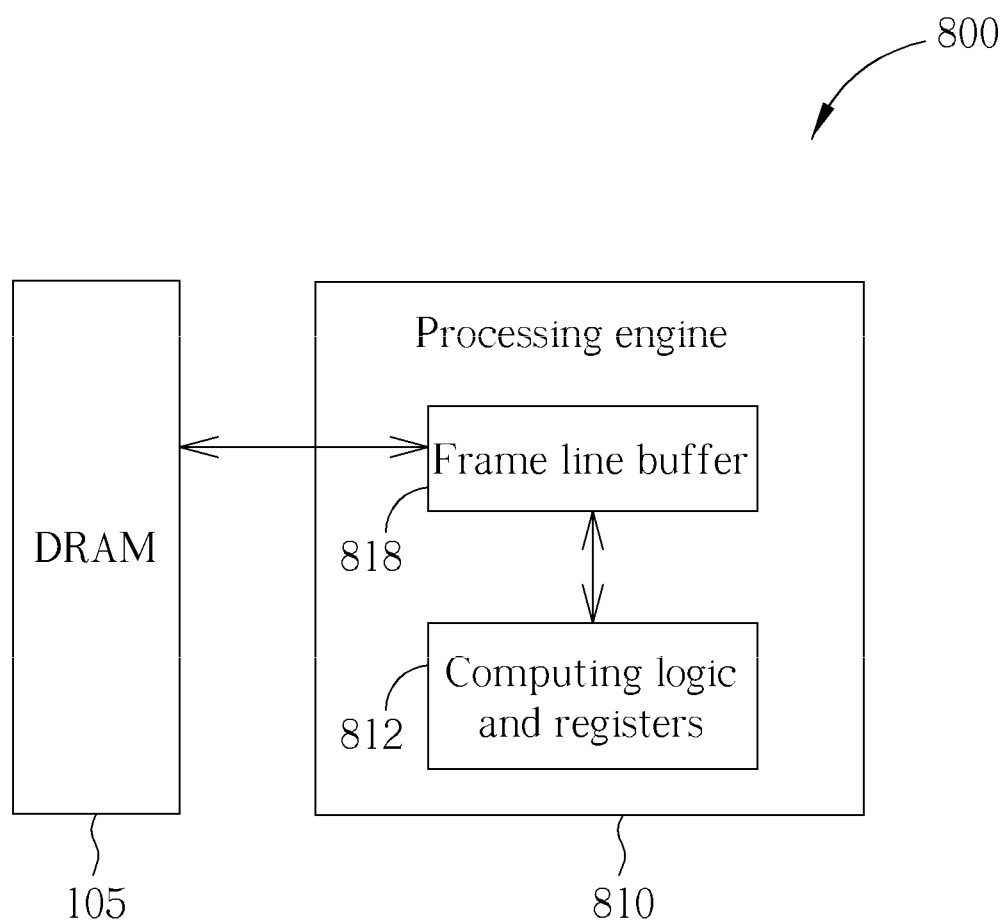
FIG. 7 is a diagram of a frame-based apparatus for iterative regularization image enhancement according to another embodiment of the present invention.
Figure 8:
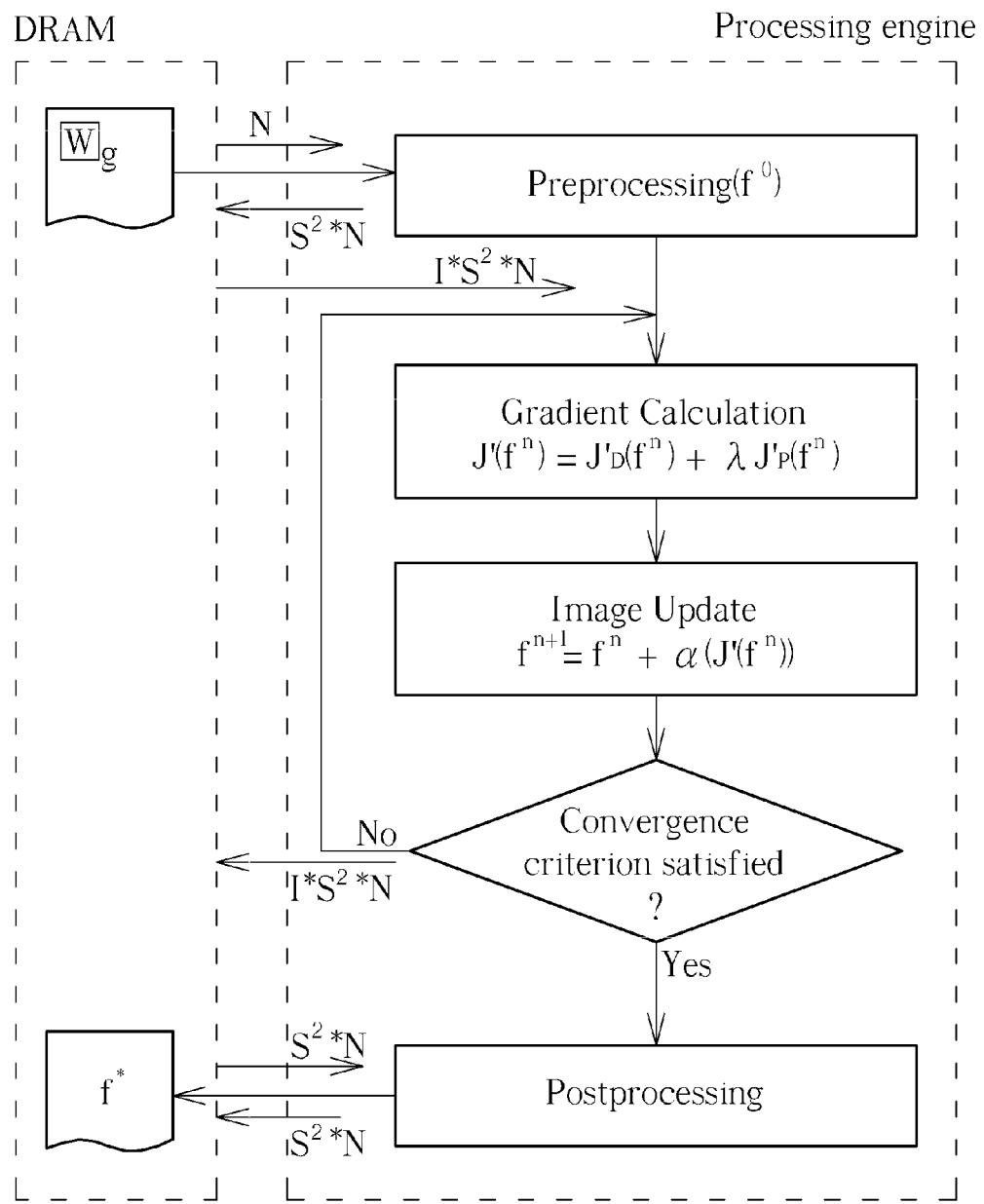
FIG. 8 illustrates some data flows between the processing engine and the DRAM shown in FIG. 7 and the data amounts respectively corresponding to the data flows according to a variation of the embodiment shown in FIG. 3.

Please refer to FIG. 7 and FIG. 8. FIG. 7 is a diagram of a frame-based apparatus 800 for iterative regularization image enhancement according to another embodiment of the present invention, where the frame-based apparatus 800 comprises the DRAM 105 and a processing engine 810 comprising a computing logic and register unit 812 (labeled "Computing logic and registers"). FIG. 8 illustrates some data flows between the processing engine 810 and the DRAM 105 shown in FIG. 7 and the data amounts respectively corresponding to the data flows according to a variation of the embodiment shown in FIG. 3.

As shown in FIG. 8, the parameters N, S, and I are utilized for describing the data amounts respectively corresponding to the data flows. For at least a portion of a frame, the processing engine 810 first loads data of a data amount of N from the DRAM 105, in order to perform the preprocessing operation (labeled "Preprocessing($f^0$)"). After the preprocessing operation, the processing engine 810 saves data of a data amount of $S^2$*N into the DRAM 105. During the iterations for the portion of the frame, the processing engine 810 loads data of a total data amount of I*$S^2$*N from the DRAM 105, and saves data of a total data amount of I*$S^2$*N into the DRAM 105. In addition, the processing engine 810 loads data of a data amount of $S^2$*N from the DRAM 105, in order to perform the postprocessing operation (labeled "Postprocessing"). After the postprocessing operation, the processing engine 810 saves data of a data amount of $S^2$*N into the DRAM 105.

Therefore, the total access bytes per frame ABPF is described as follows:

$ABPF = (2*I+3)*S^2*N+N.$

For example, given that N=(720*480), S=2, I=5, Wz=(8*8), and the region line buffer 218 comprises 7 line buffers, $ABPF = 18316800 (\approx 18M).$ In addition, the storage capacity required for implementing the region line buffer 218 in this example is:

$1440*7 = 10080 (\approx 10K).$

According to some embodiment of the present invention (e.g. some embodiments or variations mentioned above), the regions mentioned in Step 910 may represent a plurality of non-overlapped partial images of the aforementioned image (e.g. the degraded image), and the region engine mentioned in Step 910 is arranged to utilize the latest representative function $f^n$ of the region to generate an updated version of the whole of the region. This is for illustrative purposes only, and is not meant to be a limitation of the present invention. According to some embodiments of the present invention, the regions mentioned in Step 910 may represent a plurality of overlapped partial images of the aforementioned image (e.g. the degraded image), and the region engine mentioned in Step 910 is arranged to utilize the latest representative function of the region to generate an updated version of a main portion of the region.

Figure 9:
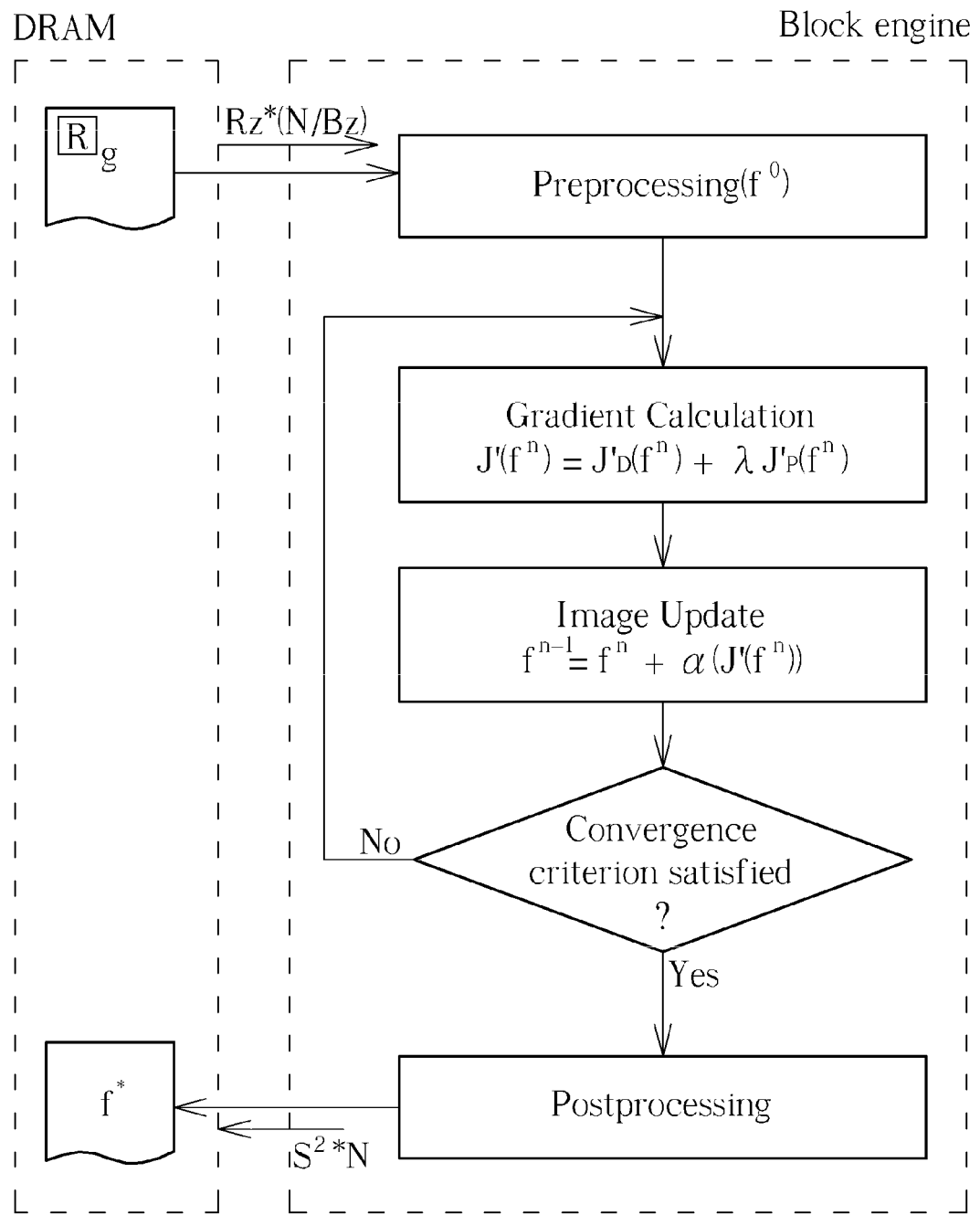
FIG. 9 illustrates some data flows between the block engine and the DRAM shown in FIG. 1 or FIG. 6 and the data amounts respectively corresponding to the data flows according to a special case of the embodiment shown in FIG. 3.
Figure 10:
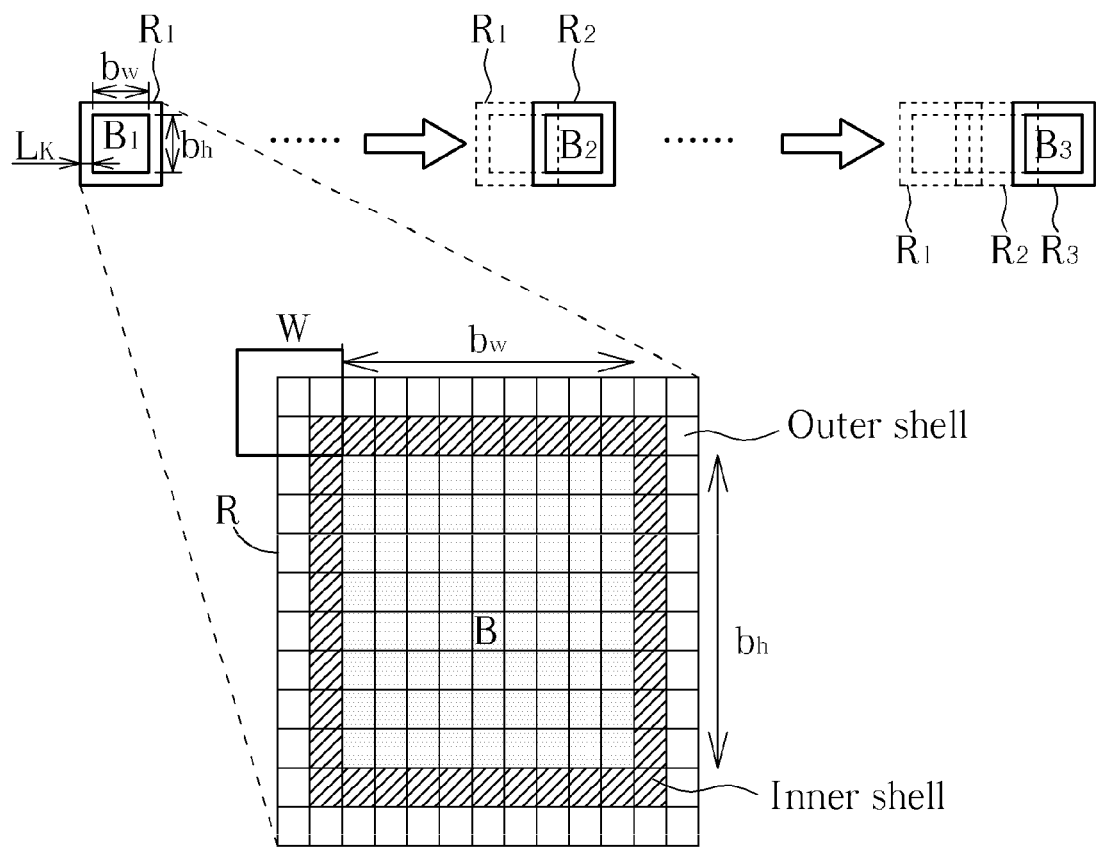
FIG. 10 illustrates some details of one of a plurality of regions utilized in the embodiment shown in FIG. 9.

Please refer to FIG. 9 and FIG. 10. FIG. 9 illustrates some data flows between the block engine and the DRAM shown in FIG. 1 or FIG. 6 (e.g. some data flows between the block engine 110 and the DRAM 105, or some data flows between the block engine 210 and the DRAM 105) and the data amounts respectively corresponding to the data flows according to a special case of the embodiment shown in FIG. 3. FIG. 10 illustrates some details of one of a plurality of regions utilized in the embodiment shown in FIG. 9.

Please note that the regions $R_1$, $R_2$, $R_3$, . . . , etc. shown in FIG. 10 represent the plurality of overlapped partial images of the aforementioned image (e.g. the degraded image), where the regions $R_1$, $R_2$, $R_3$, . . . , etc. comprise inner blocks $B_1$, $B_2$, $B_3$, . . . , etc., respectively. Within each region R of the plurality of regions $R_1$, $R_2$, $R_3$, . . . , etc., the associated inner block B comprises $b_w*b_h$ pixels. In addition to the inner block B, the region R further comprises a shell, where the shell of this embodiment comprises an inner shell (labeled "Inner shell") and an outer shell (labeled "Outer shell"). As shown in FIG. 10, the inner shell comprises one layer of pixels and the outer shell also comprises one layer of pixels, which means the shell mentioned above comprises two layers of pixels. This is for illustrative purposes only, and is not meant to be a limitation of the present invention. In general, the thickness of the shell is equivalent to $L_K$, and therefore, the total size L of the shell can be expressed as follows:

$$L=4*L_K^2+2*L_K*b_h+2*L_K*b_w.$$

That is, the value of the parameter L represents the number of pixels of the shell mentioned above.

As shown in FIG. 9, in addition to the parameters N and S, some other parameters such as Rz and Bz are utilized for describing the data amounts respectively corresponding to the data flows. The parameter Rz represents the size of the region R. That is, the value of the parameter Rz represents the number of pixels of the region R. In addition, the parameter Bz represents the size of the inner block B centered at the region R. That is, the value of the parameter Bz represents the number of pixels of the inner block B, where $Bz=b_w*b_h$. As a result, $Rz=(Bz+L)$.

For the region mentioned in Step 910, the aforementioned region engine (e.g. the block engine 110 or the block engine 210) loads data of a data amount of $Rz*(N/Bz)$ from the DRAM 105, in order to perform the preprocessing operation (labeled "Preprocessing(f$^0$)"). After the postprocessing operation, the region engine mentioned in Step 910 saves data of a data amount of $S^2*N$ into the DRAM 105. Here, the aforementioned parameters N and S can be utilized in this embodiment when needed.

Therefore, the total access bytes per frame ABPF can be described as follows:

$$ABPF=Rz*(N/Bz)+S^2*N.$$

For example, given that N=(720*480), S=2, I=5, Bz=(32*32), and Rz=(40*40), $$ABPF=1922400(\cong 2M).$$

According to this embodiment, the resultant image f* generated from the region-based implementation can be exactly the same as that generated from the frame-based implementation of another embodiment of the present invention, while the region-based implementation of this embodiment requires less hardware resources.

Typically, the pixels of the aforementioned shell of the region R (e.g. the pixels of the inner shell and the outer shell shown in FIG. 10) are also the pixels of some other regions. Please note that the shell of the region R is utilized for preventing inconsistent between regions. For example, given that a window having a window size of (3*3) is needed for the gradient calculation (e.g. Ten window size Wz of the window W is equivalent to (3*3)), and that $L_K=2$ and I=2, the pixel values of the pixels of the outer shell shown in FIG. 10 will be incorrect after the first iteration since data of some of their neighboring pixels are not in any of the SRAMs 114 and 116. In addition, the pixel values of the pixels of the inner shell shown in FIG. 10 will be incorrect after the second iteration since some incorrect pixel values of neighboring pixels (e.g. Ten pixel values of the pixels of the outer shell) are utilized for performing the gradient calculation of the pixels of the inner shell. Therefore, by utilizing the inner blocks $B_1$, $B_2$, $B_3$, . . . , etc. to generate the resultant image f*, the present invention guarantees the correctness of the resultant image f* since none of the pixel values of the inner and outer shells is utilized as a pixel of the resultant image f*. The number of iteration I depends on both the window size Wz and the number of guard pixels $L_K$.

Figure 11:
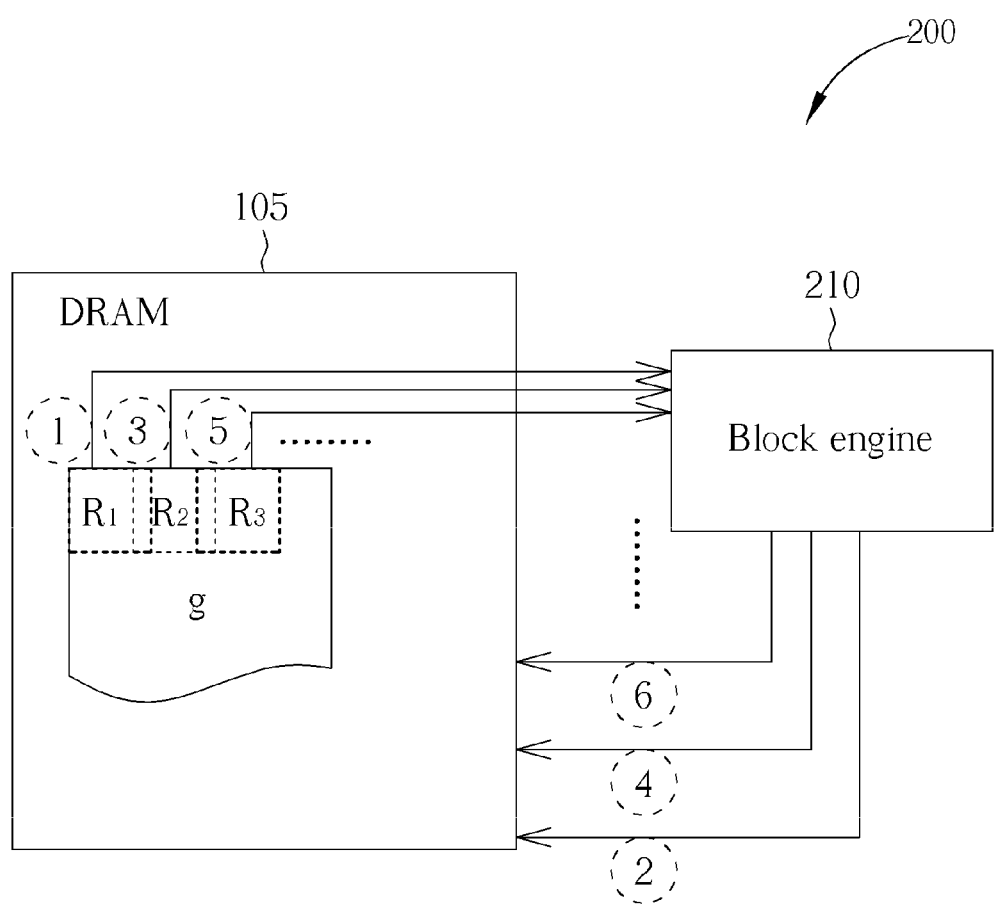
FIG. 11 illustrates an example of the order of some data flows between the block engine and the DRAM shown in FIG. 1 or FIG. 6 according to the embodiment shown in FIG. 9.

FIG. 11 illustrates an example of the sequence of some data flows between the block engine and the DRAM shown in FIG. 1 or FIG. 6 (e.g. Ten sequence of some data flows between the block engine 110 and the DRAM 105, or the sequence of some data flows between the block engine 210 and the DRAM 105) according to the embodiment shown in FIG. 9. For simplicity, the block engine 210 of the region-based apparatus 200 is taken as an example, where the data flow sequence corresponding to FIG. 1 is similar to that shown in FIG. 11. The numbers 1, 2, 3, 4, 5, 6, . . . , etc. within the circles illustrated with dashed lines represent the data flow sequence. For example, the region engine mentioned in Step 910 (e.g. Ten block engine 110 or the block engine 210) first loads data of the region $R_1$ from the DRAM 105 and executes the working flow shown in FIG. 9 for the region $R_1$, and then saves data of the iteratively regularized partial image corresponding to the region $R_1$ into the DRAM 105. Then, the region engine (e.g. Ten block engine 110 or the block engine 210) loads data of the region $R_2$ from the DRAM 105 and executes the working flow shown in FIG. 9 for the region $R_2$, and then saves data of the iteratively regularized partial image corresponding to the region $R_2$ into the DRAM 105. Similarly, the region engine (e.g. Ten block engine 110 or the block engine 210) continues the operations for subsequent regions $R_3$, $R_4$, $R_5$, . . . , etc.

Figure 12:
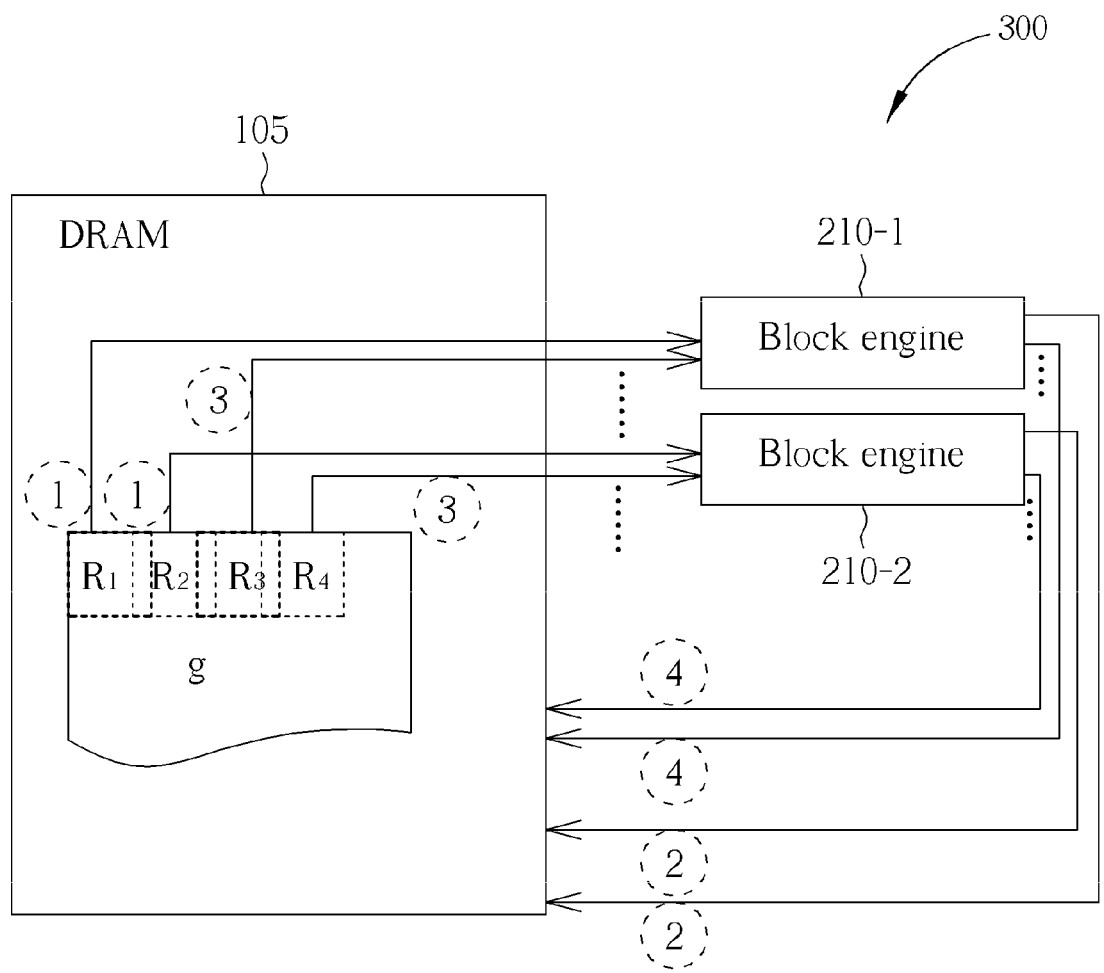
FIG. 12 illustrates an example of the order of some data flows between a DRAM and a plurality of block engines according to a third embodiment of the present invention.

FIG. 12 illustrates an example of the sequence of some data flows between a DRAM and a plurality of block engines according to a third embodiment of the present invention. The region-based apparatus 300 of this embodiment is varied from the region-based apparatus 100 shown in FIG. 1 or the region-based apparatus 200 shown in FIG. 6. As shown in FIG. 12, the region-based apparatus 300 comprises a DRAM such as the DRAM 105 and a plurality of block engines such as two block engines 210-1 and 210-2, where each of the block engines of this embodiment (e.g. Ten block engine 210-1 or the block engine 210-2) comprises the same components as those of the block engine 110 shown in FIG. 1 or those of the block engine 210 shown in FIG. 6.

The numbers 1, 2, 3, 4, . . . , etc. within the circles illustrated with dashed lines represent the data flow sequence. For example, the block engines 210-1 and 210-2 respectively load data of the regions $R_1$ and $R_2$ from the DRAM 105, and further execute the working flow shown in FIG. 9 for the regions $R_1$ and $R_2$, respectively. And the block engines 210-1 and 210-2 then save data of the iteratively regularized partial images corresponding to regions $R_1$ and $R_2$ into the DRAM 105, respectively. Then, the block engines 210-1 and 210-2 respectively load data of the regions $R_3$ and $R_4$ from the DRAM 105, and further execute the working flow shown in FIG. 9 for the regions $R_3$ and $R_4$, respectively. And the block engines 210-1 and 210-2 then save data of the iteratively regularized partial images corresponding to regions $R_3$ and $R_4$ into the DRAM 105, respectively. Similarly, the block engines 210-1 and 210-2 continue the operations for subsequent regions $R_5$, $R_6$, . . . , etc.

Figure 13:
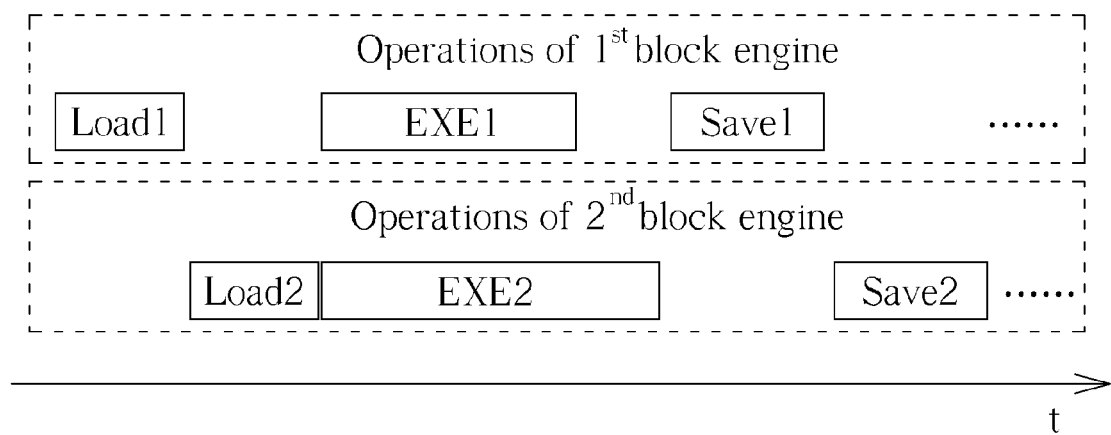
FIG. 13 illustrates an exemplary timing chart of some operations of the block engines shown in FIG. 12.

FIG. 13 illustrates an exemplary timing chart of some operations of the block engines 210-1 and 210-2 shown in FIG. 12, where the horizontal axis (labeled "t") represents the time axis. According to this embodiment, the notations "Load1", "EXE1", and "Save1" respectively represent the loading operation, the main operation (i.e. Ten block engine operations of executing the right half of the working flow shown in FIG. 9 for a region), and the saving operation performed by a $1^{st}$ block engine (e.g. Ten block engine 210-1) for a specific region such as the region $R_1$. In addition, the notations "Load2", "EXE2", and "Save2" respectively represent the loading operation, the main operation, and the saving operation performed by a $2^{nd}$ block engine (e.g. Ten block engine 210-2) for a next region, such as the region $R_2$. Similar descriptions are not repeated in detail for this embodiment.

Figure 14:
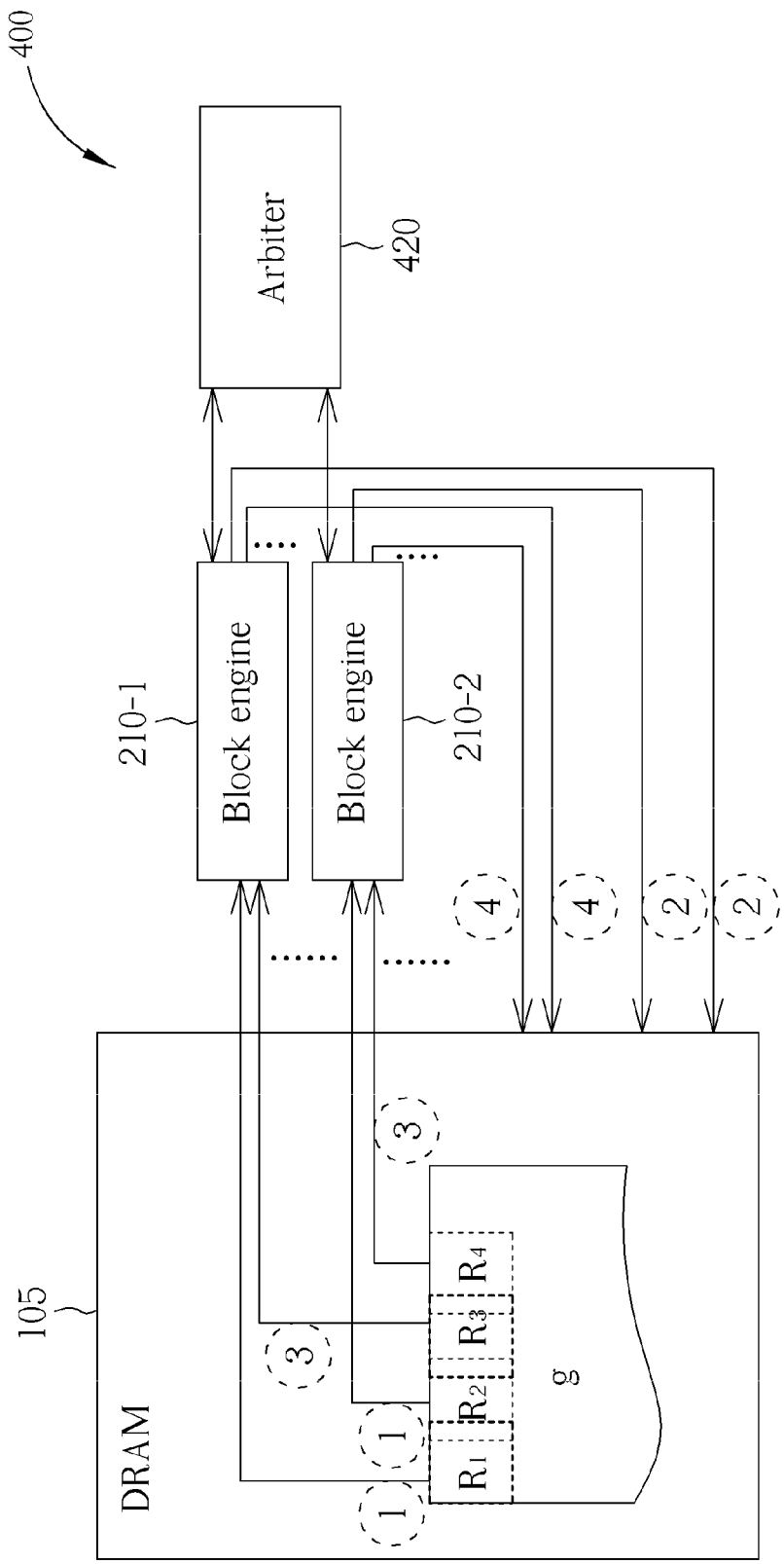
FIG. 14 illustrates an example of the order of some data flows between a DRAM and a plurality of block engines according to a fourth embodiment of the present invention, where this embodiment is a variation of the third embodiment.

FIG. 14 illustrates an example of some data flow sequence between a DRAM and a plurality of block engines according to a fourth embodiment of the present invention. The region-based apparatus 400 of this embodiment is varied from the region-based apparatus 300 shown in FIG. 12. As shown in FIG. 14, the region-based apparatus 400 comprises a DRAM such as the DRAM 105 and a plurality of block engines such as the two block engines 210-1 and 210-2, and further comprises an arbiter 420 for arbitrating operations of the block engines 210-1 and 210-2. More particularly, the arbiter 420 is a DRAM arbiter for the block engines 210-1 and 210-2.

Figure 15:
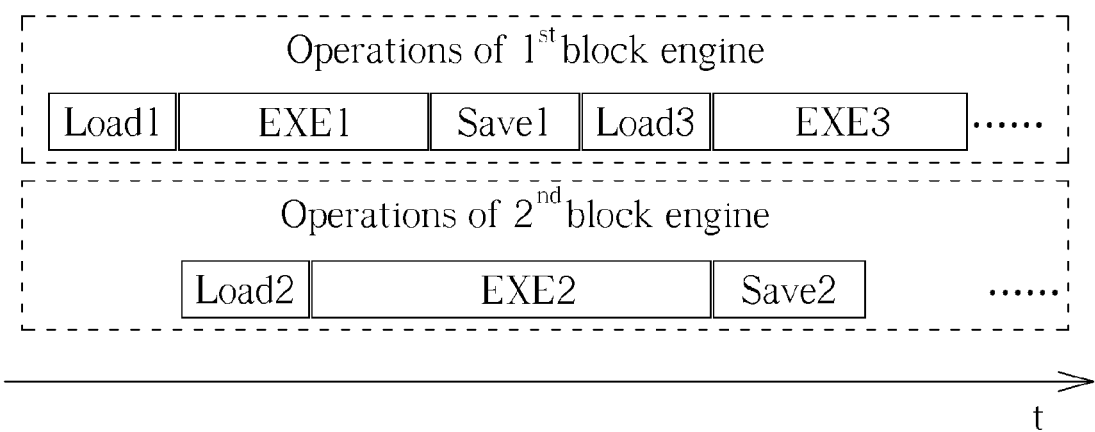
FIG. 15 illustrates an exemplary timing chart of some operations of the block engines shown in FIG. 14.

FIG. 15 illustrates an exemplary timing chart of some operations of the block engines 210-1 and 210-2 shown in FIG. 14, where the horizontal axis (labeled "t") represents the time axis. The notations "Load1", "EXE1", and "Save1" correspond to operations performed by the $1^{st}$ block engine (e.g. block engine 210-1) and the notations "Load2", "EXE2", and "Save2" correspond to operations performed by the $2^{nd}$ block engine (e.g. block engine 210-2). Some other notations such as "Load3", "EXE3", "Save3" . . . , etc. can be utilized for representing subsequent operations. For example, the notations "Load3", "EXE3", and "Save3" respectively represent the loading operation, the main operation, and the saving operation performed by the $1^{st}$ block engine (e.g. Ten block engine 210-1) for a subsequent region such as the region $R_3$. The operations of two or more block engines can be scheduled in an efficient way by utilizing a DRAM arbiter. Similar descriptions are not repeated in detail for this embodiment.

Figure 16:
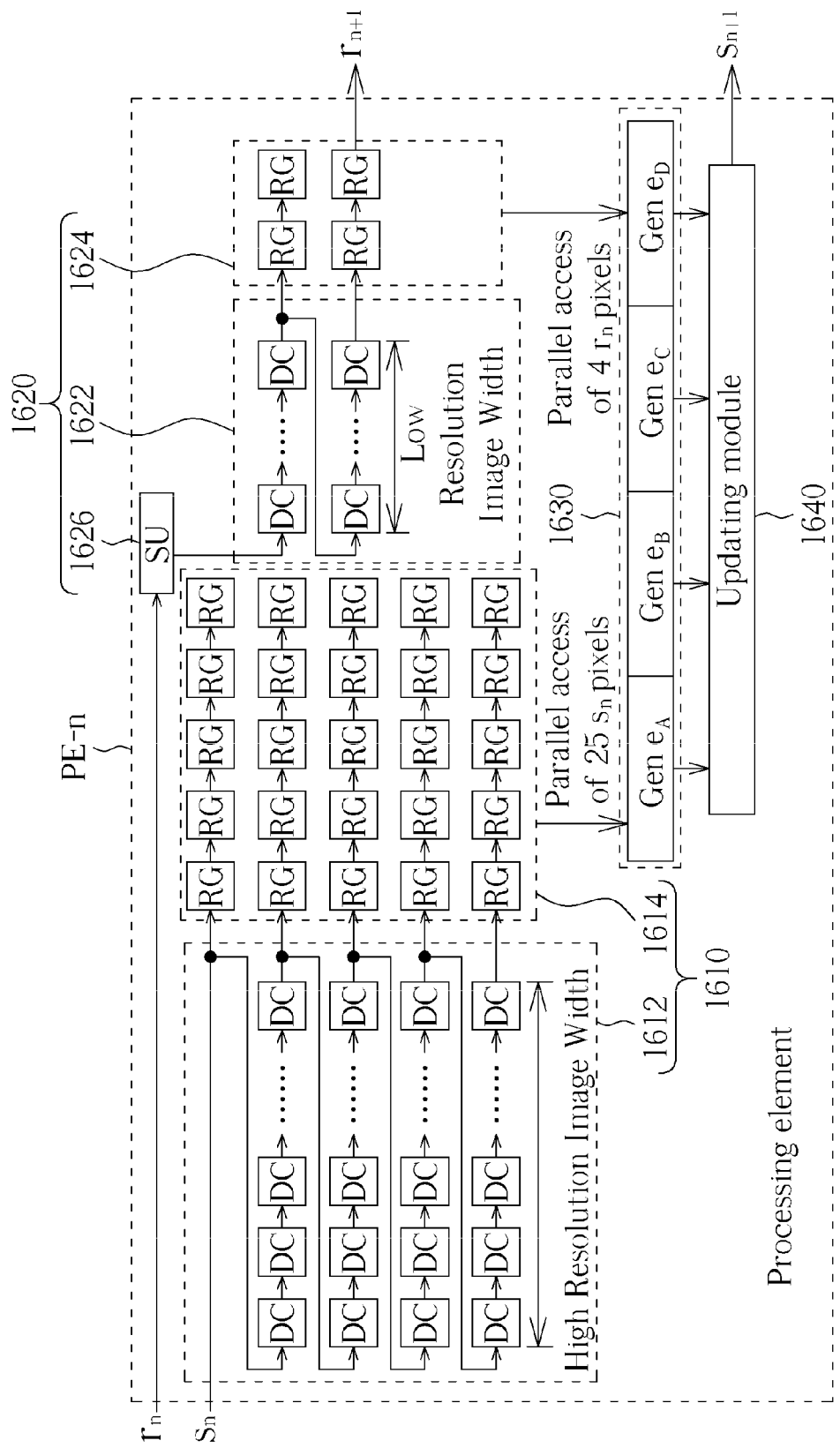
FIG. 16 is a diagram of an associated processing circuit comprising at least one processing element according to an embodiment of the present invention.

FIG. 16 is a diagram of an associated processing circuit comprising at least one processing element according to an embodiment of the present invention. More particularly, the aforementioned processing circuit comprises at least one processing element such as the processing element PE-n shown in FIG. 16.

In order to prevent confusion, some clarifications regarding the notation n are included herein. According to this embodiment, the notation n still represents the iteration index. For example, when the total number of processing elements for performing regularization image enhancement within the aforementioned processing circuit is equal to one, which means the number of iterations is equal to one in this embodiment, the iteration index n can only be zero and the processing element PE-n is substantially the processing element PE-0. In another example, when the total number of processing elements for performing regularization image enhancement within the processing circuit is equal to a predetermined processing element count that is greater than one, which means the number of iterations is equal to the predetermined processing element count of this embodiment, n can be an integer that ranges from zero to the predetermined processing element count minus one. In particular, each processing element, such as the processing element PE-n shown in FIG. 16, is utilized for performing one iteration of iterative regularization image enhancement. More specifically, the processing element PE-n performs the $(n+1)^{th}$ iteration of the iterative regularization image enhancement.

According to this embodiment, each processing element such as the processing element PE-n shown in FIG. 16 comprises a first pixel extraction module 1610, a reference pixel extraction module 1620, an error calculation module 1630, and an updating module 1640. As shown in FIG. 16, the first pixel extraction module 1610 comprises a plurality of first image delay lines 1612 and a plurality of sets of first image registers 1614 coupled to the first image delay lines 1612, where each functional block labeled "DC" represents a delay cell, and each functional block labeled "RG" represents a register. In addition, the reference pixel extraction module 1620 comprises a plurality of reference image delay lines 1622, a plurality of sets of reference image registers 1624 coupled to the reference image delay lines 1622, and a switching unit 1626 (labeled "SU" in FIG. 16). Additionally, the error calculation module 1630 comprises a plurality of error term generators such as those respectively labeled "Gen $e_A$", "Gen $e_B$", "Gen $e_C$", and "Gen $e_D$". According to this embodiment, there is no pixel data feedback path between output and input terminals of the aforementioned each processing element such as the processing element PE-n shown in FIG. 16. As there is no feedback path, when inserting pipeline registers for high speed applications is required, the chip area and the associated costs can be greatly saved in contrast to the related art.

Please note that the first image delay lines 1612 and the reference image delay lines 1622 can be implemented with registers. This is for illustrative purposes only, and is not meant to be a limitation of the present invention. According to a variation of this embodiment, the first image delay lines 1612 and the reference image delay lines 1622 can be implemented with SRAMs in order to achieve a much smaller chip area and save the associated costs.

In this embodiment, each first image delay line of the first image delay lines 1612 has a delay cell count equivalent to a first image width of a first image $s_n$, while each reference image delay line of the reference image delay lines 1622 has a delay cell count equivalent to a reference image width of a reference image $r_n$, where the first image width and the reference image width are measured in units of pixels. As the resolution of the first image $s_n$ is greater than the resolution of the reference image $r_n$ in this embodiment, the first image width of the first image $s_n$ is labeled as "High Resolution Image Width" in FIG. 16 for indicating the delay cell count of each of the first image delay lines 1612 and the reference image width of the reference image $r_n$ is labeled as "Low Resolution Image Width" in FIG. 16 for indicating the delay cell count of each of the reference image delay lines 1622.

Details of the operations of respective portions of the processing element PE-n are described as follows. The first pixel extraction module 1610 is arranged to input pixel data of the first image $s_n$ in a raster scan order and extract pixel data of a first image block of the first image $s_n$. The reference pixel extraction module 1620 is arranged to input pixel data of the reference image $r_n$ in the raster scan order and extract pixel data of a reference image block of the reference image $r_n$, where the relative location and size of the reference image block with respect to the reference image $r_n$ correspond to the relative location and size of the first image block with respect to the first image $s_n$. More specifically, the first image delay lines 1612 are arranged to input the pixel data of the first image $s_n$, and the sets of first image registers 1614 are arranged to extract the pixel data of the first image block. Similarly, the reference image delay lines 1622 are arranged to input the pixel data of the reference image $r_n$, and the sets of reference image registers 1624 are arranged to extract the pixel data of the reference image block.

Please note that the switching unit 1626 is arranged to switch an input path of the reference image delay lines 1622, in order to control the timing of inputting the pixel data of the reference image $r_n$. More particularly, in this embodiment, the switching unit 1626 is arranged to enable the input path of the reference image delay lines 1622 for every other sample of the first image $s_n$ and every other line of the first image $s_n$. As a result of the architecture shown in FIG. 16, the first image $s_n$ is input into the first pixel extraction module 1610 in a raster scan order at a rate of one sample per clock cycle, and the reference image $r_n$ is input into the reference pixel extraction module 1620 in a raster scan order at a lower rate due to the control of the switching unit 1626, causing the relative location and size of the reference image block with respect to the reference image $r_n$ to correspond to the relative location and size of the first image block with respect to the first image $s_n$.

In addition, the error calculation module 1630 is arranged to perform error calculations according to the pixel data of the first image block and the pixel data of the reference image block in order to generate one or more iterative error terms regarding a specific pixel (e.g. $P_A$, $P_a$, $P_b$, or $P_c$) of the first image block.

According to this embodiment, the error calculation module 1630 is arranged to read the pixel data of respective pixels of the first image block from the first pixel extraction module 1610 (the first image registers 1614 especially) in a parallel manner. As there are five sets of first image registers with each set of first image registers having five registers in this embodiment, the size of the first image block is arranged to be 5 by 5, and the error calculation module 1630 reads the pixel data of the (5*5) pixels of the first image block in a parallel manner.

Similarly, the error calculation module 1630 is arranged to read the pixel data of respective pixels of the reference image block from the reference pixel extraction module 1620 (the reference image registers 1624 especially) in a parallel manner. As there are two sets of reference image registers with each set of reference image registers having two registers in this embodiment, the size of the reference image block is arranged to be 2 by 2, and the error calculation module 1630 reads the pixel data of the (2*2) pixels of the reference image block in a parallel manner.

Please note that, in a situation where the specific pixel mentioned above is arranged to be positioned at the center of the first image block, the specific pixel can be the central pixel of the first image block. In this situation, the central register of the sets of first image registers 1614 (i.e. Ten central register of the central set of the sets of first image registers 1614) stores the pixel data of the specific pixel.

Figure 17:
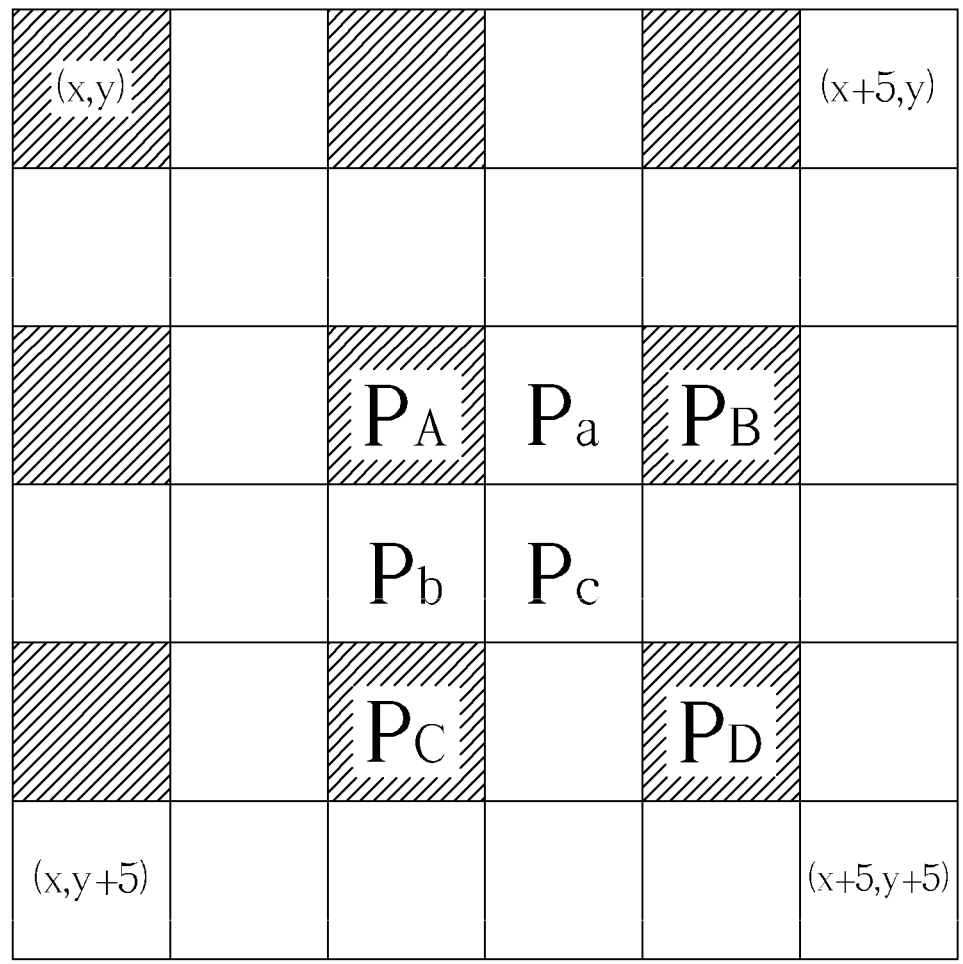
FIG. 17 illustrates relative locations of specific pixels to be updated in the embodiment shown in FIG. 16.

FIG. 17 illustrates relative locations of specific pixels (e.g. $P_A$, $P_a$, $P_b$, and $P_c$) to be updated in the embodiment shown in FIG. 16. For example, the error calculation module 1630 can generate the iterative error terms $e_A$, $e_B$, $e_C$, and $e_D$ according to the following equations:

$$e_A = r_A - K * s_{n,A};$$

$$e_B = r_B - K * s_{n,B};$$

$$e_C = r_C - K * s_{n,C}; \text{ and}$$

$$e_D = r_D - K * s_{n,D};$$

where the notation "K" represents a filter kernel such as a 3-by-3 filter kernel, and the notation "*" denotes the filtering centered at $s_{n,X}$ with X indicating a pixel location of any pixel Px of the pixels $P_A$, $P_B$, $P_C$, and $P_D$ in the above equations. In this embodiment, the error term generators labeled "Gen $e_A$", "Gen $e_B$", "Gen $e_C$", and "Gen $e_D$" in FIG. 16 generate the iterative error terms $e_A$, $e_B$, $e_C$, and $e_D$, respectively. In practice, each of the error term generators may comprise a plurality of arithmetic units, such as several multipliers and adders together with one or a few subtractors, based upon the calculations involved with the above equations.

Additionally, the updating module 1640 is arranged to update the specific pixel (e.g. $P_A$, $P_a$, $P_b$, or $P_c$) based upon the one or more iterative error terms regarding the specific pixel, such as one or more of the iterative error terms $e_A$, $e_B$, $e_C$, and $e_D$, in order to generate an updated version of the first image $s_n$ for the iteration such as the $(n+1)^{th}$ iteration of the iterative regularization image enhancement. In particular, the first pixel extraction module 1610 and the reference pixel extraction module 1620 are respectively arranged to change and align both of the relative location of the first image block with respect to the first image $s_n$ and the relative location of the reference image block with respect to the reference image $r_n$, in order to cause the updating module 1640 to update each pixel of the first image $s_n$.

In practice, the updating module 1640 can update the specific pixels $P_A$, $P_a$, $P_b$, and $P_c$ according to the following equations:

$$s_{n+1,A} = s_{n,A} + \alpha_A e_A,$$

for the specific pixel $P_A$;

$$s_{n+1,a} = s_{n,a} + \alpha_a(e_A K(1,0) + e_B K(-1,0)),$$

for the specific pixel $P_a$;

$$s_{n+1,b} = s_{n,b} + \alpha_b(e_A K(0,1) + e_C K(0,-1)),$$

for the specific pixel $P_b$; and $$s_{n+1,c} = s_{n,c} + \alpha_c(e_A K(1,1) + e_B K(-1,1) + e_C K(1,-1) + e_D K(-1,-1)),$$

for the specific pixel $P_c$;
where the notations $\alpha_A$, $\alpha_a$, $\alpha_b$, and $\alpha_c$ represent the step sizes for the specific pixels $P_A$, $P_a$, $P_b$, and $P_c$, respectively. For example, the step sizes $\alpha_A$, $\alpha_a$, $\alpha_b$, and $\alpha_c$ are dependent on one another. In particular, the step sizes $\alpha_A$, $\alpha_a$, $\alpha_b$, and $\alpha_c$ can be obtained with the same method as that for obtaining the function $\alpha$ mentioned above, where the step sizes $\alpha_a$, $\alpha_b$, and $\alpha_c$ are proportional to the step size $\alpha_A$. Similar descriptions are not repeated in detail for this embodiment.

Please note that, by respectively utilizing the first pixel extraction module 1610 and the reference pixel extraction module 1620 to change and align both of the relative location of the first image block with respect to the first image $s_n$ and the relative location of the reference image block with respect to the reference image $r_n$, the processing element PE-n can continue the updating operations with another set of pixels using the same method. For example, the other set of pixels can be a 2-by-2 block of pixels having the specific pixel $P_B$ as the upper-left pixel, a 2-by-2 block of pixels having the specific pixel $P_C$ as the upper-left pixel, a 2-by-2 block of pixels having the specific pixel $P_D$ as the upper-left pixel, . . . , etc.

Figure 18:
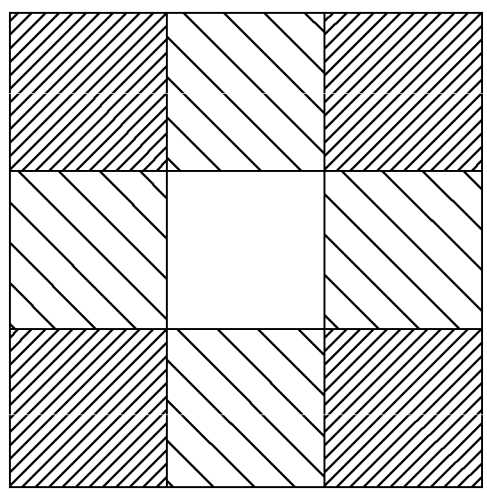
FIG. 18 illustrates a symmetric filtering scheme according to a special case of the embodiment shown in FIG. 16.

FIG. 18 illustrates a symmetric filtering scheme according to a special case of the embodiment shown in FIG. 16. In this special case, the filtering mentioned above is symmetric. That is, the filter kernel K is symmetric. As a result of applying this symmetric filtering scheme, the filter kernel weighting values $K(-1, -1)$, $K(-1, 1)$, $K(1, -1)$, and $K(1, 1)$ can be considered the same. Similarly, the filter kernel weighting values $K(0, -1)$, $K(0, 1)$, $K(-1, 0)$, and $K(1, 0)$ can be considered the same. In addition, the updating module 1640 can therefore update the specific pixels $P_A$, $P_a$, $P_b$, and $P_c$ according to the following equations:

$$s_{n+1, A} = s_{n, A} + \alpha_A e_A,$$

for the specific pixel $P_A$;

$$s_{n+1, a} = s_{n, a} + \alpha_a'(e_A + e_B),$$

for the specific pixel $P_a$;

$$s_{n+1, b} = s_{n, b} + \alpha_a'(e_A + e_C),$$

for the specific pixel $P_b$; and $$s_{n+1, c} = s_{n, c} + \alpha_c'(e_A + e_B + e_C + e_D),$$

for the specific pixel $P_c$;
where the notation $\alpha_a'$ represents the step size for the specific pixels $P_a$ and $P_b$, and the notation $\alpha_c'$ represents the step size for the specific pixel $P_c$. Please note that the step size $\alpha_a'$ is proportional to the step size $\alpha_a$, and the step size $\alpha_c'$ is proportional to the step size $\alpha_c$. Similar descriptions are not repeated in detail for this special case.

Figure 19:
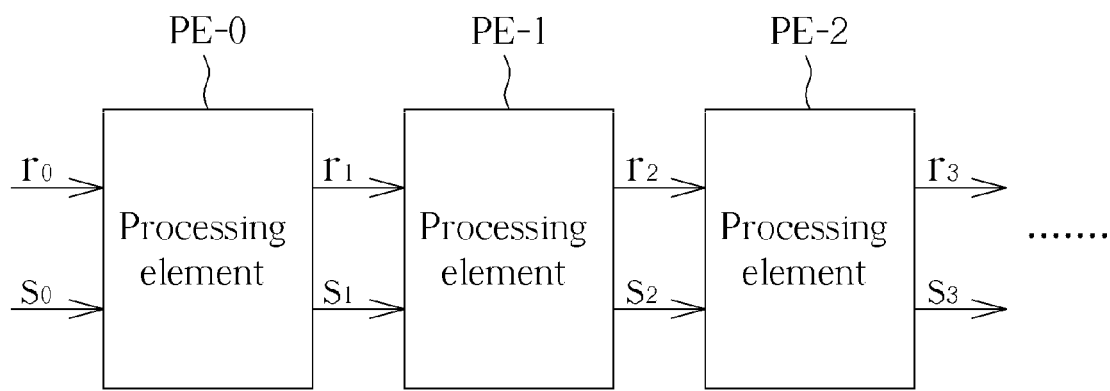
FIG. 19 is a diagram of an associated processing circuit comprising a plurality of processing elements according to a variation of the embodiment shown in FIG. 16.

FIG. 19 is a diagram of an associated processing circuit comprising a plurality of processing elements PE-0, PE-1, PE-2, . . . , etc. according to a variation of the embodiment shown in FIG. 16, where the aforementioned at least one processing element comprises the processing elements PE-0, PE-1, PE-2, . . . , etc. that are cascaded in series. Please note that each of the processing elements PE-0, PE-1, PE-2, . . . , etc. is substantially equivalent to the processing element PE-n shown in FIG. 16.

In this variation, the processing elements PE-0, PE-1, PE-2, . . . , etc. are respectively utilized for performing iterations of the iterative regularization image enhancement, such as the 1$^{st}$ iteration, the 2$^{nd}$ iteration, the 3$^{rd}$ iteration, . . . , and so on. More particularly, the processing elements PE-0, PE-1, PE-2, . . . , etc. cascaded in series are arranged to perform the iterations of the iterative regularization image enhancement without using any feedback path between the processing elements PE-0, PE-1, PE-2, . . . , etc. As there is no feedback path, when inserting pipeline registers for high speed applications is required, the chip area and the associated costs can be greatly saved in contrast to the related art.

It is another advantage of the present invention that, as there is no DRAM access inside each of the processing elements PE-0, PE-1, PE-2, . . . , etc., and as there is no DRAM access between the processing elements PE-0, PE-1, PE-2, . . . , etc., no DRAM bandwidth bottleneck will be introduced. Therefore, the performance of the processing circuit of this embodiment is better than the performance of those implemented according to the related art.

It is another advantage of the present invention that, as each of the processing elements PE-0, PE-1, PE-2, . . . , etc., such as the processing element PE-n shown in FIG. 16, inputs the pixel data of the first image $s_n$ and the reference image $r_n$ in the raster scan order and further outputs the pixel data of their updated versions $s_{n+1}$ and $r_{n+1}$ in the raster scan order, integrating the processing circuit into some other apparatus such as image processors and video playback devices can be efficiently carried out without introducing side effects or unnecessary cost increments.

Those skilled in the art will readily observe that numerous modifications and alterations of the device and method may be made while retaining the teachings of the invention.

What is claimed is:

1. A region-based method for iterative regularization image enhancement, the region-based method being applied to a processing circuit, the region-based method comprising:
    for a region of a plurality of regions of an image, performing at least one gradient calculation of an objective function of a latest representative function of the region and updating the latest representative function according to the gradient calculation; and
    for the region of the plurality of regions of the image, when at least one predetermined convergence criterion is not satisfied, iteratively updating the latest representative function according to at least one gradient calculation of the same objective function of the latest representative function until the at least one predetermined convergence criterion is satisfied, in order to enhance the image with aid of iteratively updating the latest representative function.

2. The region-based method of claim 1, further comprising:
    for the region of the plurality of regions of the image, when the predetermined convergence criterion is satisfied, performing postprocessing on the latest representative function of the region to generate an iteratively regularized partial image corresponding to the region.

3. The region-based method of claim 1, wherein the step of performing the gradient calculation of the objective function of the latest representative function of the region and updating the latest representative function according to the gradient calculation further comprises:
    performing the gradient calculation of the objective function of the latest representative function of the region by calculating a derivative of the objective function of the latest representative function; and
    updating the latest representative function according to the derivative of the objective function of the latest representative function.

4. The region-based method of claim 3, wherein the step of performing the gradient calculation of the objective function of the latest representative function of the region and updating the latest representative function according to the gradient calculation further comprises:
    updating the latest representative function with an increment/decrement whose absolute value is proportional to a function of the derivative of the objective function of the latest representative function.

5. The region-based method of claim 1, wherein the objective function is a linear combination of a data fidelity function and one or more knowledge-guided regularization functions.

6. The region-based method of claim 5, further comprising:
    calculating the objective function by summing up the data fidelity function and the one or more prior knowledge-guided regularization functions weighted by at least one Lagrange multiplier.

7. The region-based method of claim 1, wherein the plurality of regions of the image have their own sizes, respectively.

8. The region-based method of claim 1, wherein the regions represent a plurality of overlapped partial images of the image; and the method further comprises:

utilizing the latest representative function of the region to generate an updated version of a specific portion of the region.

9. The region-based method of claim 1, wherein the regions represent a plurality of non-overlapped partial images of the image; and the method further comprises:
utilizing the latest representative function of the region to generate an updated version of a whole region.

10. The region-based method of claim 1, further comprising:
for another region of the plurality of regions of the image, performing at least one gradient calculation of another objective function of a latest representative function of the other region and updating the latest representative function of the other region according to the gradient calculation of the other objective function; and
for the other region of the plurality of regions of the image, when at least one predetermined convergence criterion utilized for the other region is not satisfied, iteratively updating the latest representative function of the other region according to at least one gradient calculation of the other objective function of the latest representative function of the other region until the at least one predetermined convergence criterion utilized for the other region is satisfied, in order to enhance the image with aid of iteratively updating the latest representative function of the other region, wherein the at least one predetermined convergence criterion utilized for the other region is not necessarily equivalent to the at least one predetermined convergence criterion utilized for the region.

11. The region-based method of claim 1, further comprising:
for the plurality of regions of the image, utilizing respective one or more predetermined convergence criteria that are not necessarily equivalent to the at least one predetermined convergence criterion.

12. A region-based apparatus for iterative regularization image enhancement, the region-based apparatus being within a processing circuit, the region-based apparatus comprising:
a region engine arranged to perform iterative regularization image enhancement;
wherein for a region of a plurality of regions of an image, the region engine is arranged to perform at least one gradient calculation of an objective function of a latest representative function of the region and update the latest representative function according to the gradient calculation, and, when at least one predetermined convergence criterion is not satisfied, iteratively update the latest representative function according to at least one gradient calculation of the same objective function of the latest representative function until the at least one predetermined convergence criterion is satisfied, in order to enhance the image with aid of iteratively updating the latest representative function.

13. The region-based apparatus of claim 12, wherein for each region of a plurality of regions of an image, the region engine is arranged to perform postprocessing on the latest representative function of the region to generate an iteratively regularized partial image corresponding to the region when the predetermined convergence criterion is satisfied.

14. The region-based apparatus of claim 12, wherein the region engine is arranged to perform the gradient calculation of the objective function of the latest representative function of the region by calculating a derivative of the objective function of the latest representative function, and update the latest representative function according to the derivative of the objective function of the latest representative function.

15. The region-based apparatus of claim 14, wherein the region engine is arranged to update the latest representative function with an increment/decrement whose absolute value is proportional to a function of the derivative of the objective function of the latest representative function.

16. The region-based apparatus of claim 12, wherein the objective function is a linear combination of a data fidelity function and one or more knowledge-guided regularization functions.

17. The region-based apparatus of claim 16, wherein the region engine is arranged to calculate the objective function by summing up the data fidelity function and the one or more prior knowledge-guided regularization functions weighted by at least one Lagrange multiplier.

18. The region-based apparatus of claim 12, wherein the plurality of regions of the image have respective their own sizes, respectively.

19. The region-based apparatus of claim 12, wherein the regions represent a plurality of overlapped partial images of the image; and the region engine is arranged to utilize the latest representative function of the region to generate an updated version of a specific portion of the region.

20. The region-based apparatus of claim 12, wherein the regions represent a plurality of non-overlapped partial images of the image; and the region engine is arranged to utilize the latest representative function of the region to generate an updated version of a whole of the region.

21. The region-based apparatus of claim 12, wherein for another region of the plurality of regions of the image, the region engine is arranged to perform at least one gradient calculation of another objective function of a latest representative function of the other region and update the latest representative function of the other region according to the gradient calculation of the other objective function, and, when at least one predetermined convergence criterion utilized for the other region is not satisfied, iteratively update the latest representative function of the other region according to at least one gradient calculation of the other objective function of the latest representative function of the other region until the at least one predetermined convergence criterion utilized for the other region is satisfied, in order to enhance the image with aid of iteratively updating the latest representative function of the other region, wherein the at least one predetermined convergence criterion utilized for the other region is not necessarily equivalent to the at least one predetermined convergence criterion utilized for the region.

22. The region-based apparatus of claim 12, wherein for the plurality of regions of the image, the region engine is arranged to utilize respective predetermined convergence criteria that are not necessarily equivalent to the at least one predetermined convergence criterion.

23. The region-based apparatus of claim 12, wherein the region engine comprises:
a first region buffer arranged to store data before an iteration; and
a second region buffer arranged to store data after the same iteration;
wherein the first region buffer and the second region buffer exchange their roles for a next iteration.

24. The region-based apparatus of claim 12, wherein the region engine comprises:
a region line buffer for line-buffering within the region, wherein the region line buffer comprises one or more line buffers.

25. The region-based apparatus of claim 12, wherein the region engine is composed of multiple region engines and the multiple region engines process data in parallel.

\* \* \* \* \*